United States Patent
Blanchard et al.

(10) Patent No.: US 9,001,642 B2
(45) Date of Patent: Apr. 7, 2015

(54) SELECTIVE DOWNLINK DATA ENCRYPTION SYSTEM FOR SATELLITES

(75) Inventors: Duane L. Blanchard, Snoqualmie, WA (US); Angelia Mae Corbett, Bellflower, CA (US)

(73) Assignee: The Boeing Company, Chicago, IL (US)

( * ) Notice: Subject to any disclaimer, the term of this patent is extended or adjusted under 35 U.S.C. 154(b) by 366 days.

(21) Appl. No.: 13/403,669

(22) Filed: Feb. 23, 2012

(65) Prior Publication Data

US 2013/0077788 A1   Mar. 28, 2013

Related U.S. Application Data

(63) Continuation-in-part of application No. 13/241,766, filed on Sep. 23, 2011.

(51) Int. Cl.
  *G01R 31/08* (2006.01)
  *H04B 7/185* (2006.01)

(52) U.S. Cl.
  CPC .......... *H04B 7/18519* (2013.01); *H04B 7/1851* (2013.01); *H04B 7/18593* (2013.10)

(58) Field of Classification Search
  None
  See application file for complete search history.

(56) References Cited

U.S. PATENT DOCUMENTS

| | | | |
|---|---|---|---|
| 4,322,576 A * | 3/1982 | Miller | 380/29 |
| 6,058,307 A | 5/2000 | Garner | |
| 6,160,993 A * | 12/2000 | Wilson | 455/12.1 |
| 6,243,580 B1 | 6/2001 | Garner | |
| 6,272,338 B1 | 8/2001 | Modzelesky et al. | |
| 6,292,659 B1 | 9/2001 | Olds et al. | |
| 6,529,731 B2 | 3/2003 | Modzelesky et al. | |
| 6,542,739 B1 | 4/2003 | Garner | |
| 6,636,721 B2 | 10/2003 | Threadgill et al. | |
| 6,850,497 B1 | 2/2005 | Sigler et al. | |

(Continued)

FOREIGN PATENT DOCUMENTS

| | | |
|---|---|---|
| CN | 102684868 A | 9/2012 |
| EP | 2151930 A2 | 2/2010 |

(Continued)

OTHER PUBLICATIONS

Non-final office action dated Apr. 18, 2013 regarding U.S. Appl. No. 13/241,766, 50 pages.

(Continued)

*Primary Examiner* — Ian N Moore
*Assistant Examiner* — Latresa McCallum
(74) *Attorney, Agent, or Firm* — Yee & Associates, P.C.

(57) ABSTRACT

A method and apparatus for a satellite system. A satellite system is comprised of a communications system in a satellite and a number of computers associated with the satellite. The communications system is configured to receive first information and transmit second information from the satellite to a remote platform over a number of communications links. The number of computers is configured to identify a block of information for encryption from instructions in the first information. The number of computers is further configured to generate a key from a portion of the block of information based on the instructions. The number of computers is further configured to perform an exclusive OR operation on the block of information using the key to form a block of encrypted information. The number of computers is further configured to transmit the block of encrypted information.

20 Claims, 20 Drawing Sheets

(56) References Cited

U.S. PATENT DOCUMENTS

| | | |
|---|---|---|
| 6,912,284 B1 | 6/2005 | Palmatier |
| 7,369,660 B1* | 5/2008 | Kahn et al. .................... 380/200 |
| 7,415,329 B2 | 8/2008 | Nowak et al. |
| 7,653,349 B1 | 1/2010 | Patel |
| 7,831,202 B2 | 11/2010 | Karabinis |
| 8,355,359 B2 | 1/2013 | Atkinson et al. |
| 8,873,456 B2 | 10/2014 | Krikorian et al. |
| 2003/0007465 A1* | 1/2003 | Artzi .............................. 370/316 |
| 2005/0053033 A1 | 3/2005 | Kelly et al. |
| 2007/0167132 A1* | 7/2007 | Wahlberg et al. ............ 455/11.1 |
| 2007/0264929 A1 | 11/2007 | Chen |
| 2008/0294749 A1 | 11/2008 | Derenge et al. |
| 2010/0269143 A1 | 10/2010 | Rabowsky |
| 2011/0053628 A1 | 3/2011 | Kim et al. |
| 2012/0120870 A1* | 5/2012 | Bardout ....................... 370/326 |
| 2012/0158917 A1 | 6/2012 | Julia et al. |
| 2012/0218147 A1 | 8/2012 | Whelan et al. |
| 2013/0077561 A1 | 3/2013 | Krikorian et al. |

FOREIGN PATENT DOCUMENTS

| | | |
|---|---|---|
| GB | 2186158 A | 8/1987 |
| JP | 62114350 A | 5/1987 |
| WO | WO2013085122 A1 | 6/2013 |

OTHER PUBLICATIONS

Bennett et al., "Remote IP SATCPM Monitoring and Management," 2008 IEEE Military Communications Conference (MILCOM 2008), Nov. 2008, 5 pages.

Bester, "Automated Multi-Mission Scheduling and Control Center Operations at UC Berkeley," 2009 IEEE Aerospace Conference, Mar. 2009, 12 pages.

Calarco et al., A Statellite based System for Managing Crisis Scenarios: the E-SPONDER Perspective, Advanced Satellite Multimedia Systems Conference and the 11th Signal Processing for Space Communications Workshop, Sep. 2010, pp. 278-285.

Connary et al., "Internet Routing in Space: Architectures for Quality of Service," 2009 IEEE Aerospace Conference, Mar. 2009, 16 pages.

DRS Defense Solutions, "Connecting People Anywhere Anytime," DRS Technical Services, Inc., Product and Services Brochure, Sep. 2011, 6 pages.

Ivancic, "Secure, Autonomou, Intelligent Controller for Integrating Distributed Sensor Webs," 2007 IEEE Aerospace Conference, Mar. 2007, 6 pages.

Miller et al., "Autonomous Satellite Operations via Secure Virtual Mission Operations Center," 2010 IEEE International Geoscience and Remote Sensing Symposium (IGARSS), Jul. 2010. pp. 2607-2610.

Miller et al., "Virtual Mission Operations Center and ORS Ground System Enterprise," 7th Responsive Space Conference, Apr. 2009, 6 pages.

Pfarr et al., "Proven and Robust Ground Support Systems—FSFC Success and Lessons Learned," 2008 IEEE Aerospace Conference, Mar. 2008, 7 pages.

Final Office Action, dated Sep. 26, 2013, regarding U.S. Appl. No. 13/241,766, 34 pages.

EP search report dated Jan. 17, 2013 regarding application 12182813.1, applicant reference NAM/P123836EP00, applicant The Boeing Company, 4 pages.

UK Intellectual Property Office Search Report, dated Jul. 23, 2013, regarding Application No. GB1301265.3, 4 pages.

Notice of allowance dated Jun. 25, 2014, regarding U.S. Appl. No. 13/241,766, 20 pages.

Dykewicz, "Security Needs and Punctual Payload Delivery Must be Met," Hosted Payloads, Space News International, Nov. 2011, 4 pages.

Zetocha, "Satellite Cluster Command and Control," 2000 IEEE Aerospace Conference Proceedings, Mar. 2000, pp. 49-54.

U.S. Appl. No. 13/241,766, filed Sep. 23, 2011, 63 pages.

* cited by examiner

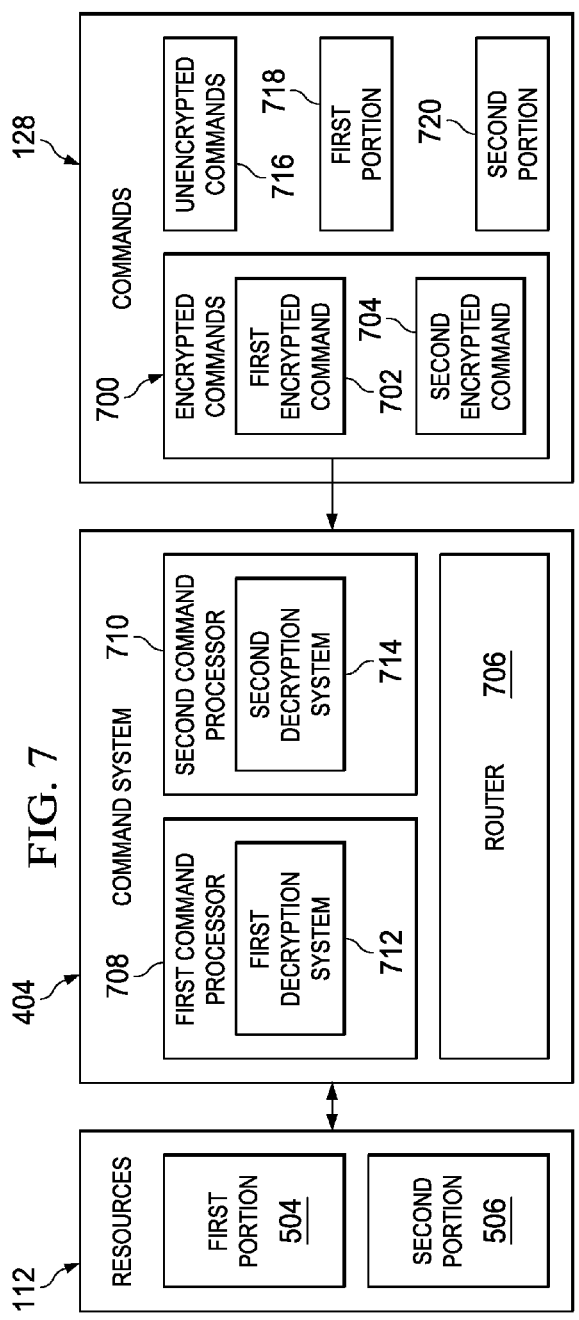
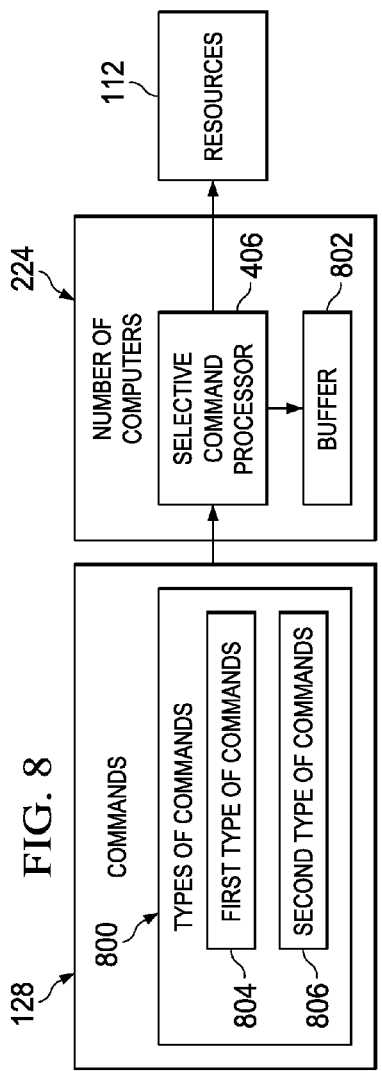
FIG. 7
FIG. 8

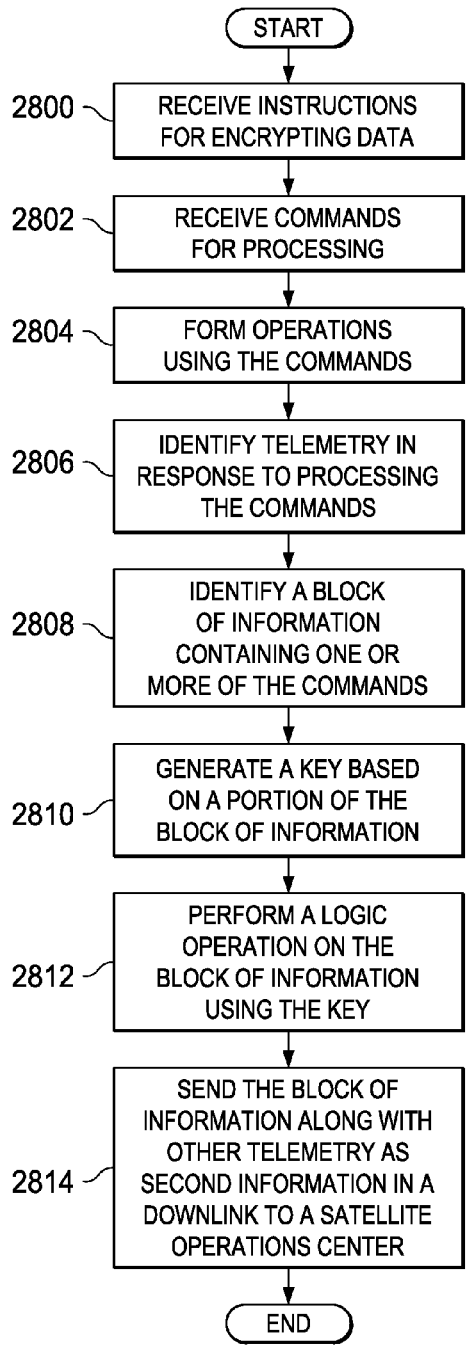
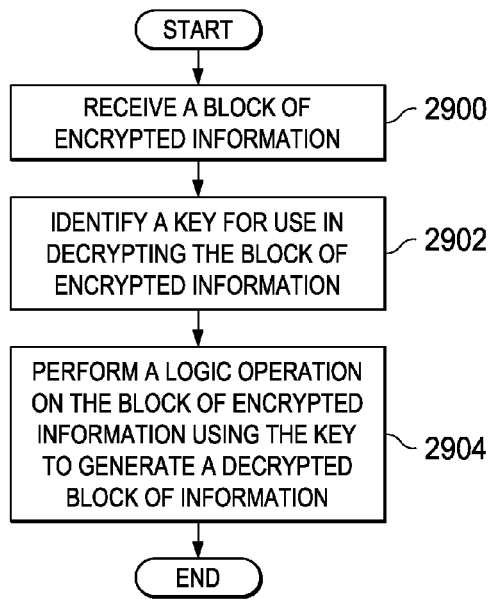
FIG. 28
FIG. 29

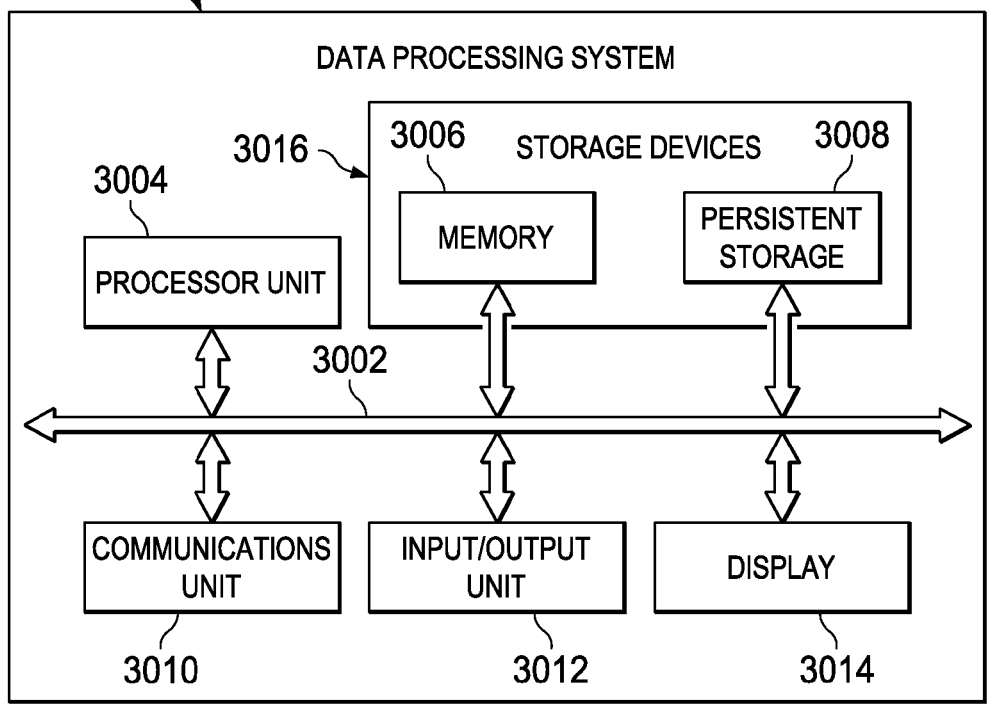
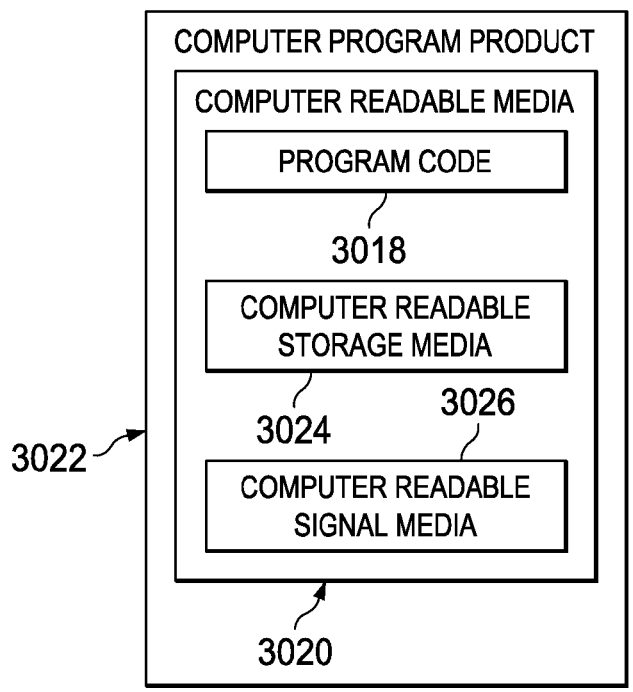
FIG. 30

SELECTIVE DOWNLINK DATA ENCRYPTION SYSTEM FOR SATELLITES

CROSS-REFERENCE TO RELATED APPLICATION

This application is a continuation-in-part of U.S. patent application Ser. No. 13/241,766, filed Sep. 23, 2011, entitled "Multi-Operator System for Accessing Satellite Resources", which is incorporated herein by reference.

BACKGROUND INFORMATION

1. Field

The present disclosure relates generally to accessing satellites and, in particular, to exchanging information with satellites. Still more particularly, the present disclosure relates to a method and apparatus for sending information from a satellite to a ground station.

2. Background

Satellites may be natural or artificial satellites. A natural satellite is a naturally occurring object in orbit, such as the moon. An artificial satellite is a satellite placed into orbit by human operators. The use of the term "satellite" in this disclosure refers to artificial satellites and not natural satellites.

Satellites are placed into orbit for different purposes. For example, a satellite may be used to collect information, transmit information, or perform other types of operations. More specifically, a satellite may be used to collect information about the surface of the Earth, oceans, weather conditions, and other types of information. Satellites also may be used to facilitate communications.

Satellites typically include computer-controlled systems. A satellite often includes a host and a payload. The host may include systems that control the satellite. These systems perform tasks, such as power generation and control, thermal control, telemetry, attitude control, orbit control, and other suitable operations.

The payload provides functions to users of the satellite. The payload may include antennas, cameras, and other suitable devices. For example, with respect to communications, the payload in a satellite may be used to provide Internet access, telephone communications, radio, television, imagery, and other types of communications.

The payload of the satellite may be used by different entities. For example, the payload may be used by the owner of the satellite, one or more customers, or some combination thereof.

For example, the owner of a satellite may lease different portions of the payload to different customers. In one example, one group of antennas on the satellite may be leased to one customer, while a second group of antennas may be leased to a second customer.

When satellites are shared by different customers, each customer may have a separate communications link and controller on the satellite. The controller allows the particular customer to control operation of the antenna and the associated communications capability of the antenna that is leased to the customer.

Leasing a satellite to multiple customers may increase the revenues that an owner of a satellite can obtain. Further, a customer may use a subset of the total resources in a satellite for a cost that is less than the cost for the customer to purchase and operate a satellite, to build and operate a satellite, or to lease an entire satellite.

The additional controllers and other hardware that allow for the end-user customers' control of a portion of a satellite's capability may increase the cost for the satellite. Further, these components also may increase the weight of the satellite by an amount that is more than desired.

Therefore, it would be desirable to have a method and apparatus that takes into account at least some of the issues discussed above as well as possibly other issues.

SUMMARY

In one illustrative embodiment, a satellite system comprises a communications system in a satellite and a number of computers associated with the satellite. The communications system is configured to receive first information and transmit second information from the satellite to a remote platform over a number of communications links. The number of computers is configured to identify a block of information for encryption from instructions in the first information. The number of computers is further configured to generate a key from a portion of the block of information based on the instructions. The number of computers is further configured to perform an exclusive OR operation on the block of information using the key to form a block of encrypted information. The number of computers is further configured to transmit the block of encrypted information.

In another illustrative embodiment, a satellite system comprises a first module in a satellite and a second module in the satellite. The first module is configured to receive first information and decrypt commands in the first information. The second module is configured to process the commands decrypted by the first module. The second module is further configured to generate a key from a portion of a block of information including a number of commands processed. The second module is further configured to perform a logic operation on a block of telemetry using the key to form a block of encrypted information. The second module is further configured to transmit the block of encrypted information.

In yet another illustrative embodiment, a method for transmitting information is present. Commands received in first information in an uplink are processed at a satellite. A block of information resulting from processing the commands is identified. A key is generated from a portion of the block of information based on instructions received in the first information. An exclusive OR operation is performed on the block of information using the key to form a block of encrypted information. The block of encrypted information is transmitted from the satellite in a downlink.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof will best be understood by reference to the following detailed description of an illustrative embodiment of the present disclosure when read in conjunction with the accompanying drawings, wherein:

FIG. 7 is an illustration of the processing of commands by a decryption system in accordance with an illustrative embodiment;

FIG. 8 is an illustration of the processing of commands by a selective command processor in accordance with an illustrative embodiment;

FIG. 28 is an illustration of a flowchart of a process for encrypting information in accordance with an illustrative embodiment;

FIG. 29 is an illustration of a flowchart of a process for decrypting information in accordance with an illustrative embodiment; and FIG. 30 is an illustration of a data processing system in accordance with an illustrative embodiment.

DETAILED DESCRIPTION

The different illustrative embodiments recognize and take into account one or more considerations. For example, the different illustrative embodiments recognize and take into account that a communications link and a controller may be shared by multiple operators. The different illustrative embodiments recognize and take into account that sharing a communications link and a controller may reduce the weight and cost of a satellite. The sharing of a communications link and a controller by more than one operator, however, may result in concerns about how commands are handled.

For example, the different illustrative embodiments recognize and take into account that when more than one operator sends commands to the satellite over a communications link, conflicts between these separate commands may occur. A conflict occurs when one or more commands are not processed as desired. Conflicts between commands may result in undesired operations occurring in the satellite. In one example, a command that is being processed may be interrupted by another command received for processing. As another example, an antenna assigned to one customer may be accidentally moved by a command generated by another customer.

The different illustrative embodiments also recognize and take into account that when more than one operator is present, it is desirable to provide a desired level of security for the operator. For example, the different illustrative embodiments recognize and take into account that, in some cases, data generated for an operator should not be observed or accessed by another operator. This data may include data generated by the satellite as a result of performing commands for an operator or data about the satellite itself. As another example, depending on the level of security, commands generated by one operator should not be observed or accessed by another operator.

Thus, one or more of the different illustrative embodiments provide a method and apparatus for facilitating the operation of a satellite by multiple operators. An illustrative embodiment allows for different levels of security to be used with commands sent to the satellite. In other words, different operators may have different levels of security used to protect the confidentiality of commands. These different levels of security may take the form of different types of encryption. The levels of security also may be enforced for data generated by the satellite for operators. In the different illustrative embodiments, combinations of the manner in which data is routed, whether data is transmitted, and encrypting of data may be used to provide a desired level of security when multiple operators operate a satellite.

Figure 1:
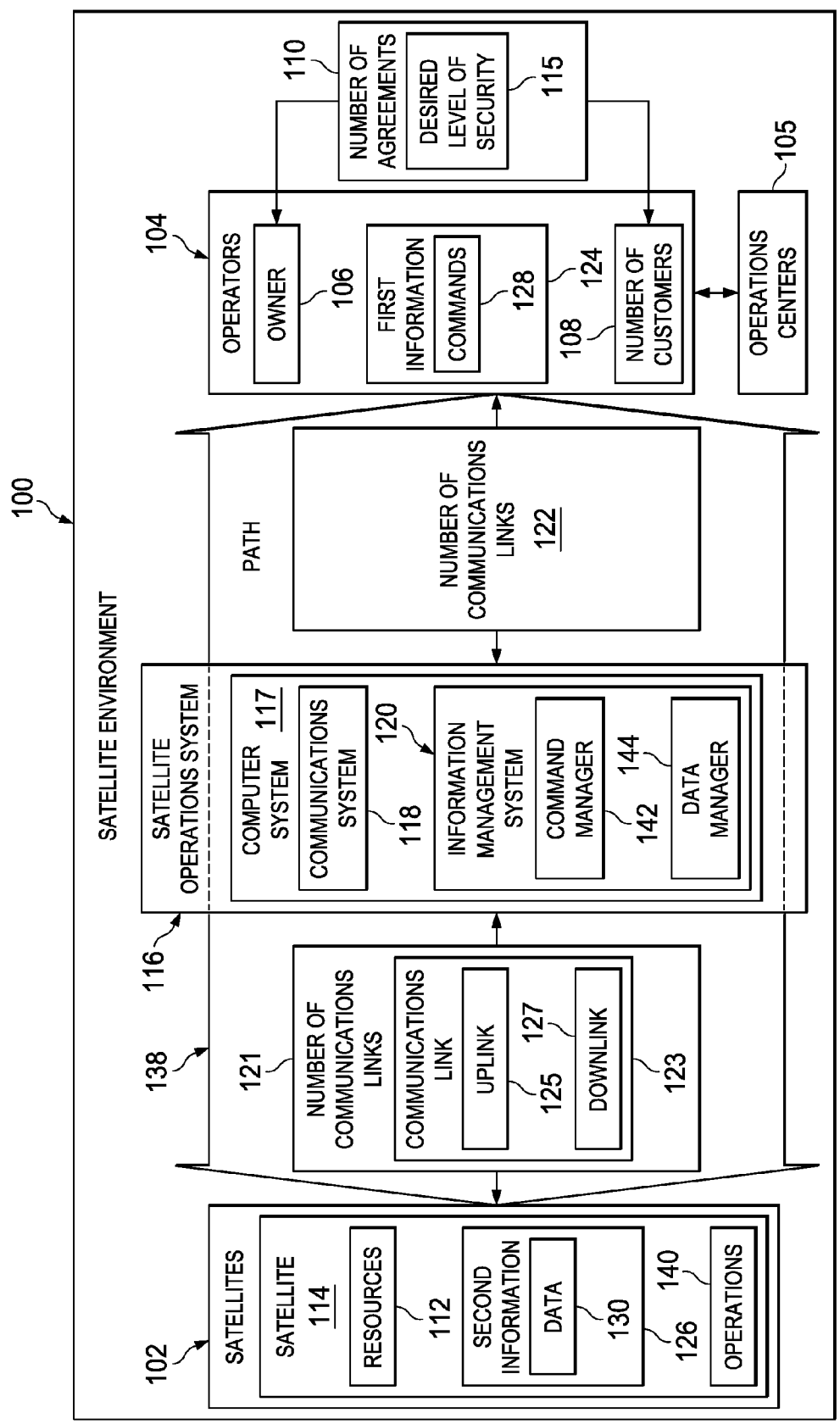
FIG. 1 is an illustration of a satellite environment in accordance with an illustrative embodiment.

With reference now to the figures and, in particular, with reference to FIG. 1, an illustration of a satellite environment is depicted in accordance with an illustrative embodiment. Satellite environment 100 includes satellites 102 operated by operators 104 at operations centers 105.

In these illustrative examples, operators 104 include owner 106 and number of customers 108. As used herein, a "number", when used with reference to elements, means one or more elements. For example, "number of customers 108" is one or more customers.

Owner 106 may have number of agreements 110 with number of customers 108. Number of agreements 110 defines the access that number of customers 108 may have to resources 112 in satellite 114.

For example, number of agreements 110 may define what satellites in satellites 102 and/or what portions of resources 112 of particular satellites in satellites 102 that number of customers 108 may access. These resources may include, for example, antennas, cameras, sensor systems, power generators, and/or other components in one or more of satellites 102.

Further, number of agreements 110 also may define desired level of security 115 that should be present. Desired level of security 115 is the security for information that operators 104 may send, receive, or both send and receive. For example, without limitation, desired level of security 115 may include levels, such as unclassified, confidential, secret, and top secret. Of course, any type of classification system for identifying the manner in which information is to be handled may be used. Desired level of security 115 may be designated using government classifications or any other suitable type of classification system desired.

Satellite operations system 116 may be implemented using computer system 117. Computer system 117 comprises one or more computers. When more than one computer is present in computer system 117, these computers may be in communication with each other. These computers may be in the same location or in different locations.

Satellite operations system 116 includes communications system 118 and information management system 120. Communications system 118 is configured to provide communications between satellites 102 and operators 104. Information management system 120 is configured to manage information that flows between satellites 102 and operators 104.

The communications between communications system 118 and satellites 102 are provided using number of communications links 121 in these illustrative examples. Communications between communications system 118 and operators 104 are provided using number of communications links 122.

In one illustrative example, communications system 118 in satellite operations system 116 establishes communications link 123 in number of communications links 121 with satellite 114 in satellites 102. Communications link 123 is used to exchange information with satellite 114 in this particular example.

For example, when communications link 123 is used to send first information 124 to satellite 114, communications link 123 is uplink 125. When communications link 123 is used to send second information 126 to operations centers 105, communications link 123 is downlink 127. In the illustrative examples, communications link 123 may function as uplink 125, downlink 127, or both.

As depicted, first information 124 is generated by operators 104. First information 124 includes commands 128.

The description of actions, such as generating first information 124 performed by operators 104, refers to actions performed using personnel, computers, electronic devices, hardware, and/or other components associated with an operator. These components may be located at one or more operations centers in operations centers 105 for a particular operator. In these illustrative examples, an operator refers to an entity. This entity may be particular person or an organization.

Second information 126 is generated by satellite 114. Second information 126 may be generated during operation of satellite 114. In these examples, second information 126 includes data 130.

Satellite operations system 116 is configured to reduce conflicts that may occur when commands 128 are generated by more than one operator in operators 104. Further, satellite operations system 116 also is configured to provide a desired level of security in handling first information 124 and second information 126. The reduction in conflicts, the desired level of security, or both may be achieved through various mechanisms. These mechanisms may include, for example, without limitation, encryption, routing of information, and other suitable mechanisms.

Satellite operations system 116 receives commands 128 from one or more of operators 104 over number of communications links 122. Satellite operations system 116 sends commands 128 generated by operators 104 to satellite 114 over uplink 125 in number of communications links 121.

In these illustrative examples, commands 128 causes operations 140 to be performed by satellite 114. In these illustrative examples, satellite operations system 116 processes commands 128 using information management system 120 and sends commands 128 to satellite 114 through uplink 125.

As illustrated, information management system 120 manages flow of first information 124 and flow of second information 126 on path 138. As depicted, path 138 begins with operators 104 and ends in satellite 114.

Also, information management system 120 in satellite operations system 116 manages the transmission of data 130 in second information 126 from satellite 114 in these illustrative examples. In one illustrative example, information management system 120 receives data 130 in second information 126 generated by satellite 114. Data 130 may be received over communications link 123 or another communications link in number of communications links 121. Information management system 120 sends data 130 to one or more of operators 104.

As depicted, information management system 120 includes command manager 142 and data manager 144. Command manager 142 is configured to manage the flow and processing of commands 128 from operators 104 to satellite 114. Data manager 144 is configured to manage the flow of data 130 from satellite 114 to operators 104.

Further, command manager 142 and data manager 144 in information management system 120 are configured to maintain desired level of security 115 between operators 104 in the flow of first information 124 and the flow of second information 126. Desired level of security 115 may include maintaining separation of commands 128 and data 130 between operators 104.

For example, one operator in operators 104 may be unable to access commands in commands 128 generated by another operator in operators 104. In a similar fashion, an operator in operators 104 may be unable to access data generated by portions of resources 112 assigned to another operator in operators 104.

In some illustrative examples, desired level of security 115 may not require encryption of some of commands 128. For example, owner 106 of satellite 114 may not need to encrypt commands in commands 128 generated by owner 106.

For example, through the use of different types of security, the visibility of commands in commands 128 generated by an operator in operators 104 may not be observable by other operators in operators 104.

Desired processing of commands 128 in satellite 114 may be performed in a desired manner using command manager 142. With the use of command manager 142, commands 128 may be processed to perform operations 140 in satellite 114 in a desired manner. In other words, conflicts in the processing of commands 128 may occur.

For example, commands 128 may be allocated to operators 104 to avoid different operators from operating portions of resources 112 not assigned to them. Command manager 142 may assign commands 128 that are specific to portions of resources 112 to particular operators in operators 104.

For example, a command in commands 128 from one operator in operators 104 only controls operation of a portion of satellite 114 without an ability to control operation of other portions of satellite 114. In other words, command manager 142 prevents operations 140 by particular operators in operators 104 in portions of satellite 114 that should not be commanded by those particular operators.

In addition to assigning specific commands to particular operators in operators 104, command manager 142 is configured to avoid undesired processing of commands 128. The undesired processing of commands 128 may include, for example, processing commands 128 in an undesired order or commands 128 resulting in the performance of operations 140 on resources 112 in satellite 114 that should not be performed. With assigning commands 128, desired level of security 115, a reduction in conflicts, or both may occur.

In one example, data for a portion of a command should not be combined with data for another portion of a command. This type of combination in the processing of commands may result in no operations being performed or an incorrect operation being performed. Data manager 144 manages the flow of data 130 in a manner that prevents access of portions of data 130 that are not intended for viewing by a particular operator or operators in operators 104.

Further, with data manager 144, portions of data 130 for a particular operator in operators 104 may be sent to that particular operator by data manager 144 using paths in number of communications links 122 that are not accessed by other operators in operators 104. In other examples, portions of data 130 for the particular operator may remain untransmitted on satellite 114. With routing of data 130 by data manager 144, desired level of security 115 may be maintained for data 130. As a result, in one or more illustrative embodiments, satellite operations system 116 provides an ability for more than one operator to perform operations using satellites 102.

As can be seen, satellite operations system 116 provides an ability for owner 106 and number of customers 108 to perform operations 140 using satellite 114. Further, management of commands 128 and data 130 by information management system 120 is performed with desired level of security 115 for operators 104. With satellite operations system 116, operators in operators 104 may share resources 112 in satellite 114 in a manner that avoids undesired exposure of information between operators 104. In these examples, first information 124 generated by operators 104 and second information 126 generated by satellite 114 may be separated between different operators in operators 104 through satellite operations system 116.

With one or more illustrative embodiments, satellite operations system 116 provides an ability to share satellite 114 between operators 104. This sharing of satellite 114 is performed in a manner that avoids incorrect performance of operations 140 in response to receiving commands 128 from operators 104. Additionally, satellite operations system 116 also maintains independence of data 130, security of data 130, or both. In the depicted examples, data 130 is handled in a manner that avoids undesired exposure of data 130 to operators within operators 104 that should not have data 130.

The illustration of satellite environment 100 in FIG. 1 is not meant to imply physical or architectural limitations to a manner in which an illustrative embodiment may be implemented. Other components in addition to and/or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, the management of first information 124 and second information 126 with respect to satellite 114 may be applied to other satellites in satellites 102. Further, in some illustrative examples, one or more satellites in satellites 102 may not be operated by more than one operator in operators 104.

As yet another illustrative example, one or more illustrative embodiments may be applied to other types of spacecraft other than satellites. For example, satellite operations system 116 may be configured to control resources on a space station or other type of spacecraft.

As another illustrative example, one operator may be allowed to operate portions of resources 112 assigned to another operator. For example, owner 106 may be allowed to operate portions of resources 112 assigned to a customer in number of customers 108 in some circumstances. For example, number of agreements 110 may allow owner 106 to operate portions of resources 112 assigned to that customer if, for example, diagnostics or maintenance is needed for those portions.

In yet another illustrative example, first information 124 may include other types of information other than commands 128. For example, first information 124 may include programs, data, configuration files, and other suitable types of information. In a similar fashion, second information 126 also may include other types of information other than data 130. For example, copies of programs and configuration files on satellite 114 may be included in second information 126 as well as other suitable types of information.

Figure 2:
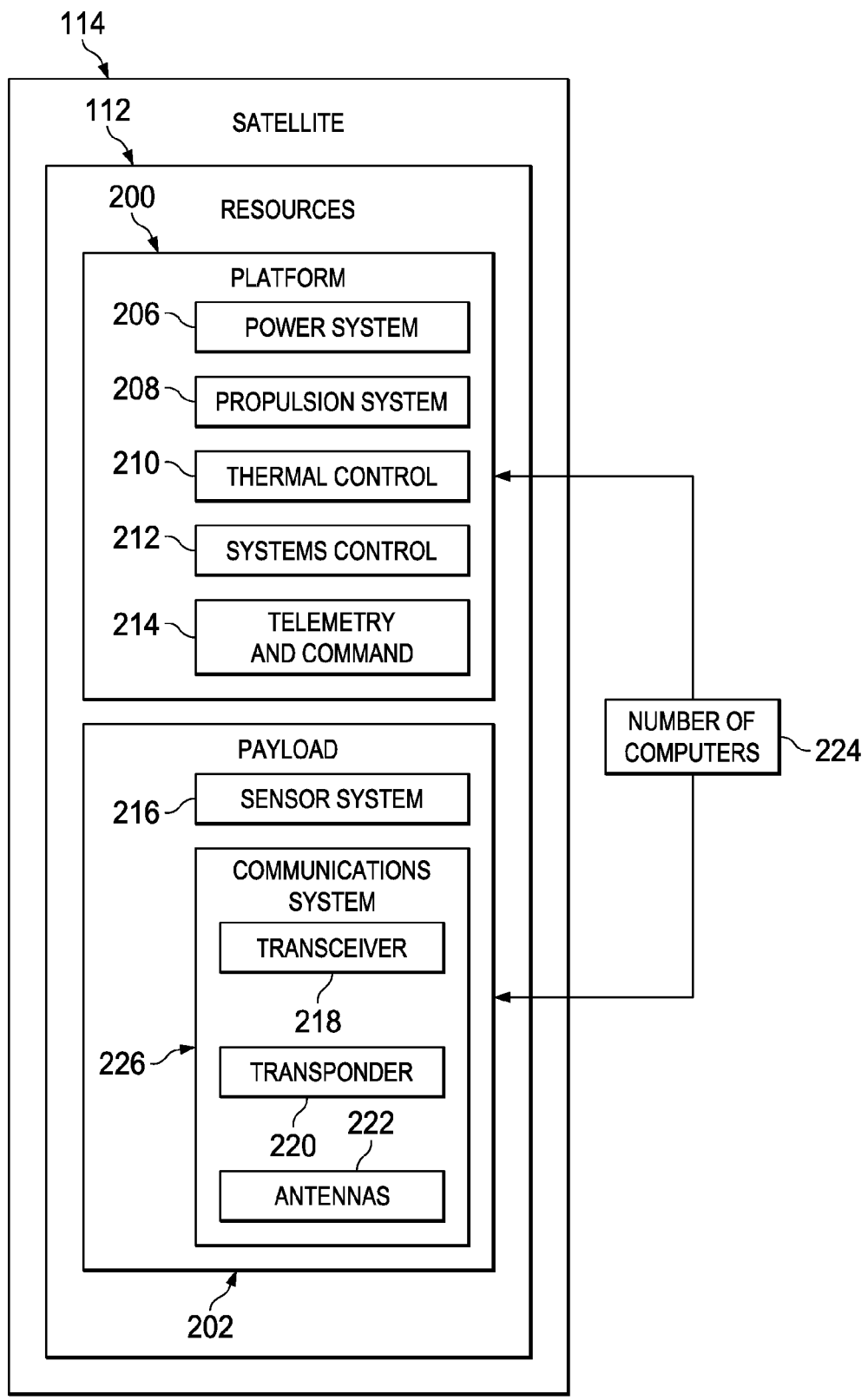
FIG. 2 is an illustration of a block diagram of resources in a satellite in accordance with an illustrative embodiment.

Turning next to FIG. 2, an illustration of a block diagram of resources in a satellite is depicted in accordance with an illustrative embodiment. An illustration of examples of resources 112 that may be found in satellite 114 is depicted.

Resources 112 in satellite 114 are divided between platform 200 and payload 202. In one illustrative example, owner 106 in FIG. 1 operates platform 200, and number of customers 108 in FIG. 1 operates payload 202.

As depicted, platform 200 may include power system 206, propulsion system 208, thermal control 210, systems control 212, telemetry and command 214, and other suitable components. Payload 202 may include sensor system 216, transceiver 218, transponder 220, antennas 222, and other suitable components.

Power system 206 provides power to operate components within satellite 114. Propulsion system 208 is configured to make changes in the orientation or position of satellite 114. Thermal control 210 is configured to control the temperature of different components of satellite 114. Thermal control 210 may cool or heat components, depending on the particular component. Systems control 212 provides attitude control and coordination between all the systems in satellite 114. Telemetry and command 214 is configured to monitor and direct other systems in satellite 114. Telemetry and command 214 may identify the status of the systems.

In payload 202, sensor system 216 may be different types of sensors configured to gather data. For example, sensor system 216 may include a telescope, a camera, and other suitable types of sensors.

Transceiver 218 is configured to send and receive signals. Transceiver 218 may be used to provide communications between different systems that may be located on the Earth or in space. Transponder 220 is configured to receive signals, amplify the signals, and send the signals. Antennas 222 may provide communications for components in payload 202.

Transceiver 218, transponder 220, and antennas 222 form communications system 226 in the illustrative examples. As depicted, communications system 226 is used to establish communications links 123, which may be downlink 127, uplink 125, or both in FIG. 1.

In the illustrative example, communications system 226 may be used by different components in satellite 114 to transmit second information 126 in FIG. 1. For example, telemetry and command 214 may include a data transmitter that transmits second information 126 using antennas 222 in communications system 226. Alternatively, telemetry and command 214 may send second information 126 to transceiver 218 for transmission using antennas 222.

In these illustrative examples, number of computers 224 is configured to receive commands 128 and send data 130 in FIG. 1. Also, number of computers 224 processes commands 128. Number of computers 224 may cause operations involving different resources to be performed in at least one of platform 200 and payload 202.

Number of computers 224 may be located in platform 200, payload 202, or both. Further, number of computers 224 is part of information management system 120 in FIG. 1. For example, number of computers 224 may be a computer within computer system 117 in information management system 120.

Number of computers 224 may be configured to process commands 128 such that operations 140 in FIG. 1 using resources 112 are performed in a desired manner. Additionally, number of computers 224 also may be configured to manage data 130. The processing of commands 128 and the management of data 130 are performed in a manner that provides a desired level of security between operators 104 in FIG. 1. Additionally, the processing of commands 128 is performed in a manner such that undesired operations of resources 112 in satellite 114 are reduced or avoided.

Figure 3:
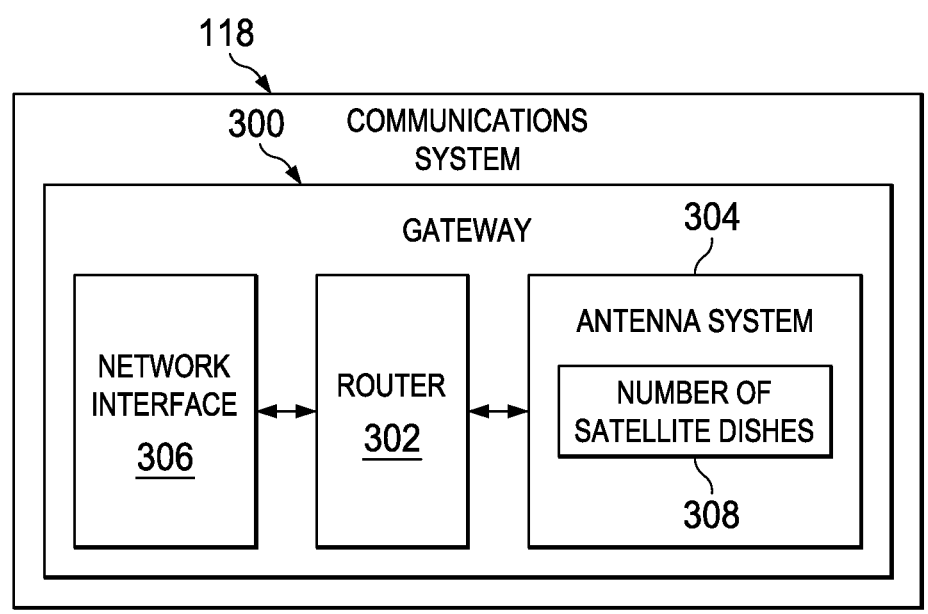
FIG. 3 is an illustration of a block diagram of a communications system in accordance with an illustrative embodiment.

With reference next to FIG. 3, an illustration of a block diagram of a communications system is depicted in accordance with an illustrative embodiment. Examples of components that may be used in communications system 118 are depicted.

In one illustrative example, communications system 118 may take the form of gateway 300. Gateway 300 may include router 302, which is connected to antenna system 304 and network interface 306. Router 302 is configured to control the flow of information between antenna system 304 and network interface 306. Router 302 may direct information received through antenna system 304 to different operators in operators 104 using network interface 306.

In this illustrative example, antenna system 304 may comprise number of satellite dishes 308. Number of satellite dishes 308 may be used to establish communications link 123 with satellite 114 in FIG. 1. Network interface 306 is configured to provide number of communications links 122 to operators 104 in FIG. 1 in these illustrative examples. "A number", as used herein with reference to an item, means one or more items.

Number of communications links 122 may be to a network data processing system. The network data processing system may include one or more networks selected from at least one of a local area network (LAN), a wide area network (WAN), an intranet, the Internet, and some other suitable type of network.

Figure 4:
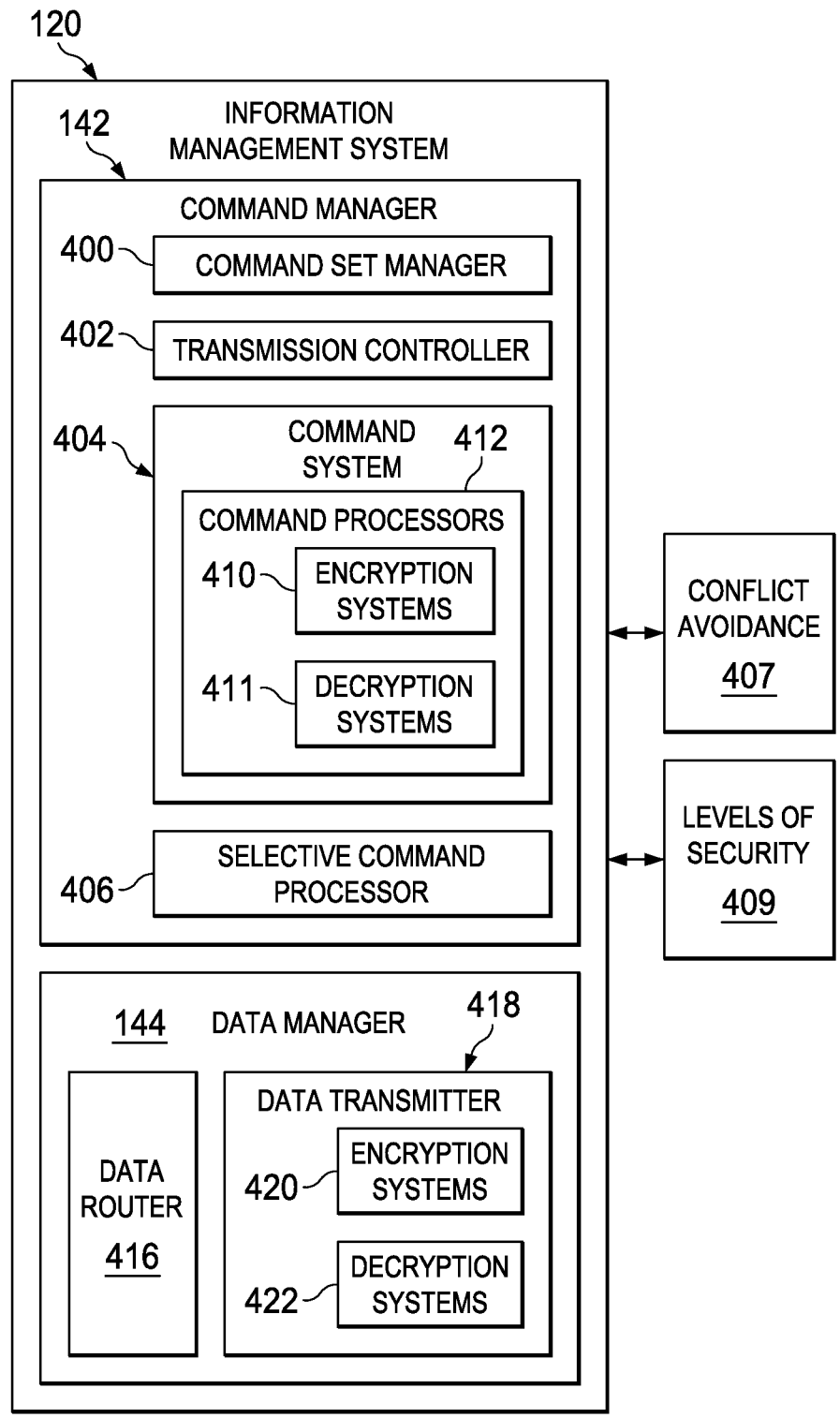
FIG. 4 is a more-detailed illustration of an information management system in accordance with an illustrative embodiment.

Turning next to FIG. 4, a more-detailed illustration of an information management system is depicted in accordance with an illustrative embodiment. In this illustrative example, command manager 142 in information management system 120 may include at least one of command set manager 400, transmission controller 402, command system 404, selective command processor 406, and other suitable types of systems that process commands 128 in FIG. 1.

In these illustrative examples, information management system 120 may be used to provide conflict avoidance 407 and levels of security 409. Conflict avoidance 407 avoids conflict between commands 128 issued by different operators in operators 104 in FIG. 1. Levels of security 409 are different levels of security used by different operators in operators 104 in FIG. 1. Levels of security 409 may be applied to both commands 128 and data 130 in these illustrative examples.

In these illustrative examples, conflict avoidance 407 may be provided using at least one of routing of commands, managing sending of commands, encryption of commands, and other suitable mechanisms. Levels of security 409 may be provided using at least one of routing of commands and data, encryption of commands and data, and other suitable mechanisms.

These components in command manager 142 process commands 128 to perform operations 140 using resources 112 in FIG. 1 in a desired manner. These components process commands 128 in a manner that separates commands 128 from different operators to provide conflict avoidance 407. As a result, conflicts between commands 128 may be avoided.

In other words, these components may be used to avoid undesired operations from being performed by resources 112 in satellite 114. In addition, a desired level of security in levels of security 409 between commands 128 is maintained. In other words, different operators may not be able to observe what particular commands in commands 128 are being sent by other operators. These different components may be implemented using software, hardware, or a combination of the two.

Command manager 142 may be located in computer system 117 in satellite operations system 116 in FIG. 1. In particular, command manager 142 may be located in one or more operations centers in operations centers 105 in FIG. 1.

Command manager 142 may reduce or avoid undesired processing of commands 128 through a number of different mechanisms. For example, command set manager 400 in command manager 142 assigns groups of commands for operators 104. Command set manager 400 distributes the groups of commands to operators 104 for generating commands 128.

A group of commands in the groups of commands are commands for particular resources in resources 112 for satellite 114 in FIG. 1. Each operator in operators 104 is provided with a group of commands from the groups of commands.

The commands in a group of commands assigned to an operator are commands that operate selected resources in resources 112 in satellite 114. These selected resources are resources assigned to that particular operator. These commands are not designed to operate other resources in resources 112 in the illustrative examples.

For example, a command in a group of commands may change a position of an antenna assigned to the operator. When using those commands, the operator is unable to change the position of other antennas other than the antenna assigned to the operators. In this manner, conflicts between commands may be reduced.

Transmission controller 402 is configured to determine which operator can send commands for processing. In this example, transmission controller 402 only allows a particular operator in operators 104 to send commands 128. Transmission controller 402 may be located in an operations center in operations centers 105 or other locations. The management of who can send commands 128 is managed using a token. With transmission controller 402, conflicts between commands also may be reduced by only allowing a single operator to send commands at any point in time.

Command system 404 is configured to process commands 128 for a particular operator such that only commands for resources assigned to that operator are processed. Command system 404 may be located in number of computers 224 in FIG. 2.

Command system 404 is configured to process commands 128 that are received for satellite 114. Command system 404 comprises command processors 412. Command processors 412 may be implemented using hardware. In particular, command processors 412 may be located in number of computers 224.

In these illustrative examples, command processors 412 may include encryption systems 410 and decryption systems 411. Each encryption system in encryption systems 410 is configured to encrypt a command using a particular type of encryption system. Each decryption system in decryption systems 411 is configured to decrypt a command that has been encrypted using a particular type of encryption system.

As a result, a decryption system in decryption systems 411 is only able to decrypt commands encrypted in the particular type of encryption. Decryption systems 411 are unable to decrypt other types of commands.

In these depicted examples, each operator in operators 104 is assigned a type of encryption. In these illustrative examples, the encryption is performed by operators 104 when generating commands 128. Each operator in operators 104 uses a particular type of encryption in encryption systems 410. As a result, when commands 128 are received, a decryption system only decrypts those commands encrypted with the same type of encryption. Those commands may then be processed by the command processor in which the decryption system is located.

In another illustrative example, each operator in operators 104 may be assigned a particular command processor in command processors 412 in command system 404. With a command processor processing commands only for a particular operator, a conflict in commands also may be reduced in the illustrative examples.

Selective command processor 406 is located in number of computers 224 in satellite 114 in these examples. Selective command processor 406 is configured to process commands for particular resources in resources 112 based on the types of commands 128. Different operators in operators 104 may use different types of commands. By assigning a particular type of command to a portion of resources 112 and assigning another type of command to other portions of resources 112, an undesired operation of resources 112 may be avoided through the use of different types of commands 128. In other words, a desired level of security, a reduction in conflicts between commands, or both may occur through the assignment of commands.

As depicted, data manager 144 in information management system 120 includes data router 416 and data transmitter 418. Data manager 144 may be located in a number of different locations. Data router 416 may be located in an operations center, a communications system, or both. Data transmitter 418 may be located in number of computers 224, a communications system, an operations center, or all of these.

Data router 416 and data transmitter 418 each may be implemented in hardware, software, or a combination of the two. When software is used, the operations performed by the components may be implemented in program code configured to be run on a processor unit. When hardware is employed, the hardware may include circuits that operate to perform the operations in the components.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations.

Examples of programmable logic devices include, for example, without limitation, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being.

Data router 416 is configured to route data received from satellite 114 to different operators in operators 104. In particular, data router 416 in data manager 144 is configured to route data received from satellite 114 to operators 104 with the desired level of security for operators 104.

Data router 416 may route the data over communications systems that are not shared between the different operators. For example, data for a particular operator may be sent over a communications system that is established with that operator and not another operator in operators 104. For example, data router 416 may route mission data in data 130 to an operations center in operations centers 105 for a customer in number of customers 108 without passing through an operations center in operations centers 105 for owner 106 in FIG. 1. This type of routing of data 130 may be employed to maintain a desired level of security for the customer.

Data transmitter 418 is a component configured to transmit second information 126 from satellite 114. As depicted, data transmitter 418 is configured to control data transmitted from satellite 114 back to operators 104. For example, a module may be configured to selectively send downlink 127 to operations centers 105 to maintain the desired level of security. In other words, data 130 sent in downlink 127 may be received by one or more of operations centers 105. At least some of data 130 may be encrypted by a second module using a process implemented in accordance with an illustrative embodiment. This data may be decrypted by the operations center receiving data 130 or by some other operations center or entity.

For example, a first portion of data 130 may be telemetry for a first customer in number of customers 108, and a second portion of data 130 may be for a second customer in number of customers 108. In one illustrative example, the first customer may be a commercial entity, such as an automobile manufacturer, while the second customer may be a government entity.

The first customer may use satellite 114 to obtain images for public relations purposes, such as commercials. The first portion of data 130 may be telemetry indicating where cameras are pointed to generate images for a commercial.

The second customer may use satellite 114 to obtain images for intelligence purposes, such as identifying troop or ship movements. The second portion of data 130 may be telemetry indicating where the cameras are pointing to generate images for these movements.

The first customer may not care whether telemetry in the first portion of data 130 can be viewed by others. In contrast, the second entity may require that the telemetry in the second portion of data 130 be encrypted such that only the second customer may know where the cameras are pointed. In the illustrative examples, the second portion of data 130 may be encrypted in accordance with an illustrative embodiment as described in more detail below.

In this manner, the second portion of data 130 may only be viewable by the second customer. In other words, a satellite operations center in operations centers 105 may receive the second portion of data 130 and send that second portion of data 130 to the second entity. This transmission of the second portion of data 130 occurs without anyone in the satellite operations center being able to view the second portion of data 130 in an unencrypted form.

Alternatively, the data may be deleted instead of being stored on satellite 114. For example, some data that includes an identification of particular controlled resources and the changes to those configurations may be left on satellite 114 without being transmitted back to the operators.

In one illustrative example, data transmitter 418 also may include encryption systems 420 and decryption systems 422. Data transmitter 418 may encrypt the data using an encryption system that is assigned to a particular operator using encryption systems 420. Data transmitter 418 may decrypt commands using a decryption system in decryption systems 422 that is assigned to a particular operator.

For example, when data transmitter 418 is located in satellite 114, data transmitter 418 may selectively encrypt data 130 sent in downlink 127. In other words, data transmitter 418 may encrypt portions of data 130 for one customer in number of customers 108, while other portions of data 130 for a second customer remain unencrypted. This type of selective encryption may be performed for any number of customers or other entities, depending on the particular implementation.

Data transmitter 418 in information management system 120 is another example of a component that may be combined, divided, or both combined and divided. For example, data transmitter 418 may be divided into a plurality of data transmitters in locations that may employ functions from data transmitter 418.

Figure 5:
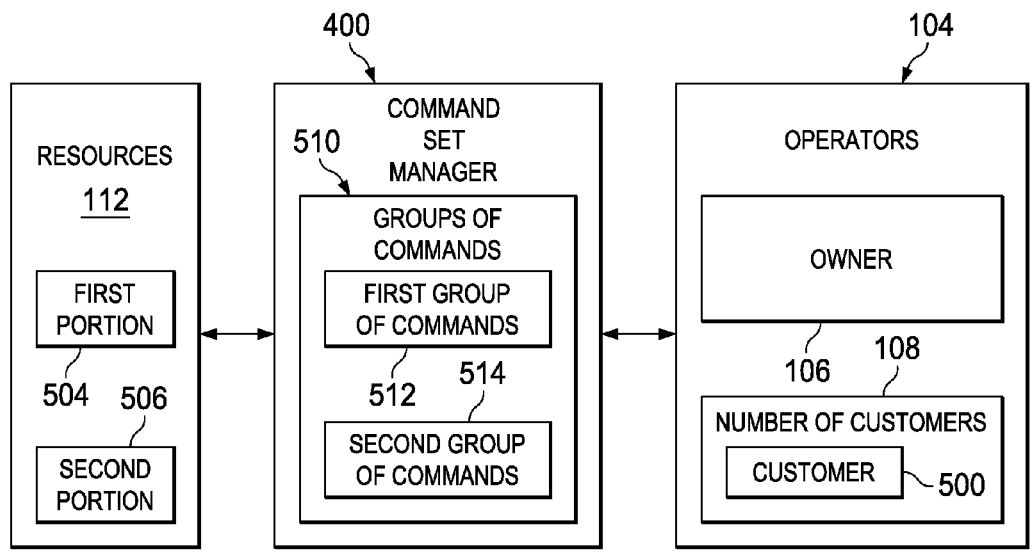
FIG. 5 is an illustration of managing groups of commands in accordance with an illustrative embodiment.

Turning now to FIG. 5, an illustration of managing groups of commands is depicted in accordance with an illustrative embodiment. In this illustrative example, command set manager 400 is configured to manage groups of commands 510.

Groups of commands 510 are used to operate resources 112. In these illustrative examples, groups of commands 510 are assigned to operators 104. Groups of commands 510 are assigned to operators 104 in a manner such that each operator only operates portions of resources 112 assigned to that particular operator.

In one illustrative example, operators 104 include owner 106 and customer 500 in number of customers 108. As illustrated, owner 106 is assigned to first portion 504 of resources 112. Customer 500 is assigned to second portion 506 of resources 112. First portion 504 and second portion 506 may be all or some of resources 112, depending on the particular implementation.

In this illustrative example, groups of commands 510 are identified for operating resources 112. Groups of commands 510 include first group of commands 512 and second group of commands 514.

As depicted, first group of commands 512 includes commands that operate first portion 504 of resources 112 in satellite 114 in FIG. 1. Second group of commands 514 operates second portion 506 of resources 112 in satellite 114 in FIG. 1.

In these illustrative examples, the different groups of commands may be mutually exclusive. In particular, the commands in first group of commands 512 only operate first portion 504 of resources 112 and are unable to cause the operation of second portion 506 of resources 112. Second group of commands 514 only operates second portion 506 of resources 112 and not first portion 504 of resources 112.

Command set manager 400 assigns first group of commands 512 to owner 106 and second group of commands 514 to customer 500. In this manner, each operator in operators 104 sending a command from the group of commands assigned to that operator is only able to cause the operation of resources assigned to that particular operator.

For example, customer 500 sending a command from second group of commands 514 results in an operation only of a resource within second portion 506 of resources 112. The operation of a resource in first portion 504 of resources 112 cannot occur through this selection of commands within second group of commands 514.

For example, a command to change the azimuth and elevation for an antenna in second portion 506 of resources 112 is only able to change the azimuth and elevation for that antenna and not another antenna that may be in first portion 504 of resources 112.

In another example, first portion 504 may include a particular command processor in command processors 412 while second portion 506 may include a different command processor in command processors 412, in FIG. 4. In this manner, conflicts between processing of commands may be reduced by assigning particular command processors to particular operators in operators 104. A command designated for a particular command processor may have an identification of the command processor in the command or otherwise associated with the command.

In other illustrative examples, some commands in groups of commands 510 may be assigned to more than one customer in number of customers 108. For example, some commands in first group of commands 512 may also be present in second group of commands 514. For example, owner 106 and customer 500 may both have access to the same resource in resources 112. In another example, owner 106 also may access the same antenna as customer 500. Owner 106 may access the antenna for troubleshooting or maintenance purposes. As a result, first group of commands 512 and second group of commands 514 may both include a command for access to the antenna. If a command is common to both operators, then the resource or resources accessed using the command is a shared resource between the operators.

Figure 6:
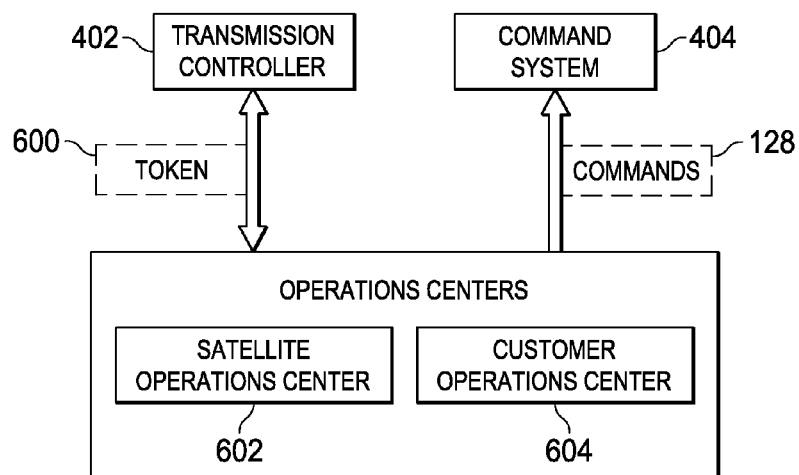
FIG. 6 is an illustration of an operation of a transmission controller in accordance with an illustrative embodiment.

Turning now to FIG. 6, an illustration of an operation of a transmission controller is depicted in accordance with an illustrative embodiment. In this illustrative example, transmission controller 402 is configured to control token 600. In particular, transmission controller 402 is configured to control who has token 600. Token 600 provides the holder of token 600 permission or an ability to send commands 128 to satellite 114 in FIG. 1. For example, token 600 may be sent to an operator in operations centers 105 that desires to send commands 128 to satellite 114.

An operations center within operations centers 105 is unable to send commands for processing by satellite 114 without first receiving token 600. In this illustrative example, transmission controller 402 sends token 600 to one operations center within operations centers 105. Only the operations center having token 600 is able to send commands 128 to satellite 114.

In one illustrative example, operations centers 105 include satellite operations center 602 and customer operations center 604. In one example, customer operations center 604 may request token 600 when customer operations center 604 desires to send commands 128 to operate resources 112 in satellite 114.

If transmission controller 402 has not sent token 600 to satellite operations center 602, transmission controller 402 sends token 600 to customer operations center 604. With token 600, customer operations center 604 sends commands 128 to perform operations in satellite 114. Command system 404 receives commands 128 and sends commands 128 to satellite 114 using command system 404.

In these illustrative examples, satellite operations center 602 does not need to request token 600 from transmission controller 402 when transmission controller 402 is located in satellite operations center 602. As a result, if token 600 has not been sent to customer operations center 604, satellite operations center 602 is able to send commands 128 to satellite 114 using command system 404. If token 600 has been sent to customer operations center 604, satellite operations center 602 is unable to send commands 128 to satellite 114.

When customer operations center 604 has completed sending commands 128, customer operations center 604 returns token 600 to transmission controller 402. At this time, transmission controller 402 may send token 600 to satellite operations center 602. Satellite operations center 602 may then send commands 128 for processing.

In these illustrative examples, operations centers 105 may be configured not to send commands 128 without the receipt of token 600. Alternatively, command system 404 may be configured to only accept commands 128 from an operations center that has token 600.

Turning next to FIG. 7, an illustration of the processing of commands by a decryption system is depicted in accordance with an illustrative embodiment. In this illustrative example, command system 404 is located in satellite 114 in FIG. 1. In particular, command system 404 may be located in number of computers 224 in FIG. 2. As illustrated, command system 404 is configured to receive commands 128 as encrypted commands 700.

As depicted, encrypted commands 700 include first encrypted command 702 and second encrypted command 704. First encrypted command 702 is encrypted differently than second encrypted command 704. In these illustrative examples, the difference in encryption may be through the use of a different key or password but having the same type of encryption algorithm. In other examples, the difference in encryption between the commands may be through the use of a different type of encryption algorithm.

As illustrated, command system 404 includes router 706, first command processor 708, and second command processor 710. First decryption system 712 is associated with first command processor 708. Second decryption system 714 is associated with second command processor 710.

In this illustrative example, encrypted commands 700 are received by router 706. Encrypted commands 700 are sent to first command processor 708 and second command processor 710. Both first decryption system 712 in first command processor 708 and second decryption system 714 in second command processor 710 may attempt to decrypt encrypted commands 700.

First decryption system 712 is configured to decrypt first encrypted command 702. Second decryption system 714 is configured to decrypt second encrypted command 704.

In this illustrative example, first command processor 708 is associated with first portion 504 in resources 112, and second command processor 710 is associated with second portion 506 in resources 112. As a result, commands decrypted by first decryption system 712 for first command processor 708 are used to perform operations on first portion 504 and not on second portion 506. In a similar fashion, commands decrypted by second decryption system 714 for second command processor 710 are processed to perform operations on second portion 506 and not on first portion 504.

In this manner, command system 404 reduces a chance that some commands in commands 128 may be sent to resources 112 that should not receive those commands. Thus, chances for a collision between commands in commands 128 during decryption of commands 128 may be reduced using command system 404.

In another illustrative example, commands 128 are designated to particular command processors. For example, first portion 718 of commands 128 is designated for processing by first command processor 708. Second portion 720 of commands 128 is designated for processing by second command processor 710.

With this depicted example, router 706 only sends first portion 718 of commands 128 to first command processor 708 and only sends second portion 720 of commands 128 to second command processor 710. First portion 718 and second portion 720 of commands 128 may or may not be encrypted.

Commands 128 may be designated for a particular command processor using a number of different mechanisms. For example, a command processor identifier may be included with each command in commands 128. In another example, each command may be associated with an identification of an operator. Router 706 routes commands 128 based on these identifiers. With the routing of commands 128, conflicts between commands 128 may be reduced or avoided.

Although the examples in FIG. 7 are illustrated using encrypted commands 700, a mixture of encrypted commands and unencrypted commands may be used. For example, owner 106 in operators 104 in FIG. 1 may generate unencrypted commands 716 in commands 128. However, number of customers 108 in operators 104 in FIG. 1 may generate encrypted commands 700 in commands 128.

When unencrypted commands 716 are present, each command in commands 128 may be designated for a particular command processor in command system 404. For example, commands 128 for first portion 504 of resources 112 may be directed to first command processor 708. Commands 128 for second portion 506 in resources 112 may be directed to second command processor 710. Further, when commands in commands 128 are directed to a particular command processor in command system 404, these command processors also may handle encrypted commands.

With reference next to FIG. 8, an illustration of the processing of commands by a selective command processor is depicted in accordance with an illustrative embodiment. In this illustrative example, selective command processor 406 is located in satellite 114 in FIG. 1. Selective command processor 406 may be implemented in number of computers 224 in these illustrative examples.

Selective command processor 406 is configured to issue commands 128 to resources 112 based on types of commands 800 present in commands 128. Some types of commands may be given a priority over other types of commands.

In one illustrative example, commands 128 may be selectively buffered in buffer 802 based on types of commands 800. The buffering may be used to provide priority of processing commands. For example, first type of commands 804 and second type of commands 806 may be present in types of commands 800. First type of commands 804 may be buffered in buffer 802, while second type of commands 806 may be processed without buffering. In other words, second type of commands 806 may be processed with a priority over first type of commands 804 in these illustrative examples.

In one illustrative example, data for first type of commands 804 may be received in portions. Data for each portion of a command in first type of commands 804 is placed into buffer 802 until the command is complete. At that point, the command may be processed to operate resources 112.

If only a portion of the data for a command in first type of commands 804 is buffered in buffer 802 and a command in second type of commands 806 is received, the command in second type of commands 806 is processed without delay. The command in buffer 802 waits in buffer 802 until all of the data for the command is received. At that time, the command is processed. Of course, other types of events and priority systems may be used. With selective command processor 406, conflicts between commands stored in buffer 802 may be avoided.

Of course, priority may be given to different types of commands 800 in other ways. For example, a type of command may be based on the identity of the operator. For example, commands from a customer may be given priority over commands from an owner of satellite 114.

In yet another example, priority may be based on resource selection in satellite 114. For example, first type of commands 804 may relate resources 112 used to maintain safety of satellite 114 and may be given priority over second type of commands 806 used to operate resources 112 in the form of payload 202 in FIG. 2. Priority may also be based on other factors, such as, for example, command bit selection, processor selection, and other suitable factors.

Figure 9:
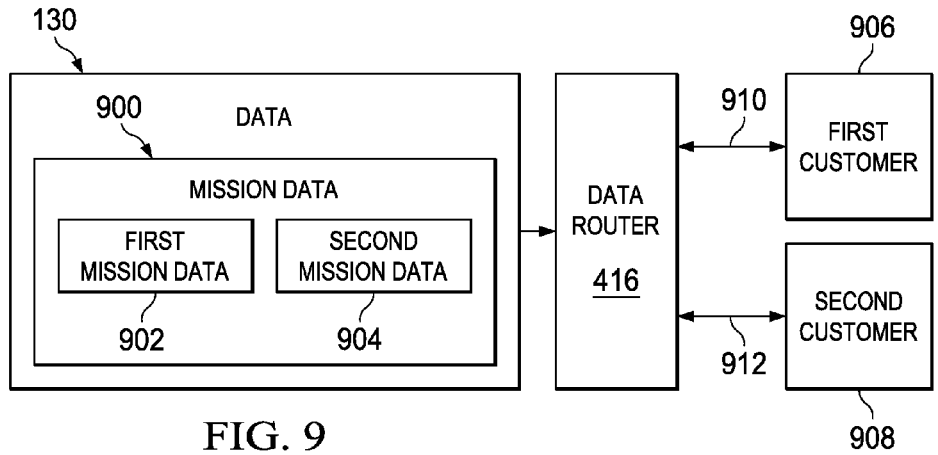
FIG. 9 is an illustration of an operation of a data router in accordance with an illustrative embodiment.

In FIG. 9, an illustration of an operation of a data router is depicted in accordance with an illustrative embodiment. In this illustrative example, data router 416 receives data 130 in the form of mission data 900.

Mission data 900, in this example, may include mission data for different operators. For example, mission data 900 may include first mission data 902 and second mission data 904.

As depicted, data router 416 may send first mission data 902 to first customer 906. Second mission data 904 is sent to second customer 908. In these illustrative examples, first mission data 902 is sent to first customer 906 over communications link 910. Second mission data 904 is sent to second customer 908 over communications link 912.

Communications link 910 and communications link 912 are not shared between first customer 906 and second customer 908. Communications link 910 provides communications only with first customer 906. Communications link 912 provides communications only with second customer 908.

As a result, first mission data 902 sent over communications link 910 is not received by second customer 908. Second mission data 904 sent over communications link 912 to second customer 908 is not received by first customer 906.

Alternatively, data router 416 may encrypt first mission data 902 using an encryption system assigned to first customer 906. Second mission data 904 may be encrypted using an encryption system assigned to second customer 908. The encryption system assigned to second customer 908 is different from the encryption system assigned to first customer 906.

Figure 10:
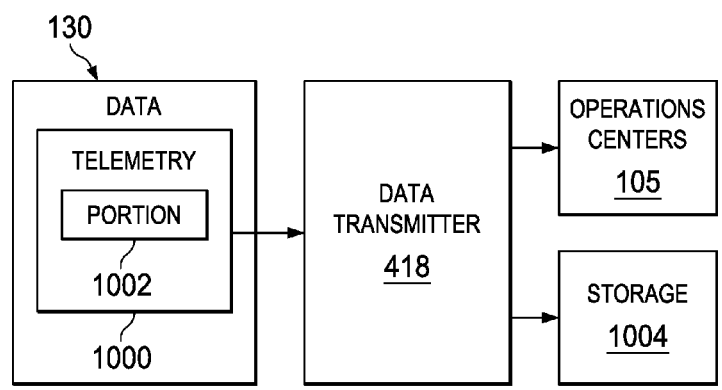
FIG. 10 is an illustration of an operation of a data transmitter in accordance with an illustrative embodiment.

Turning next to FIG. 10, an illustration of an operation of a data transmitter is depicted in accordance with an illustrative embodiment. In this illustrative example, data transmitter 418 receives data 130 in the form of telemetry 1000.

Telemetry 1000 is data generated about satellite 114 in FIG. 1. For example, telemetry 1000 may include the temperature of components, a position of antennas, an orientation of satellite 114, a charge level in a battery, an amount of current generated by a solar cell, commands processed by satellite 114, and other suitable types of information.

When telemetry 1000 is sent to operations centers 105, telemetry 1000 may pass through an operations center from an owner to a customer. Some part of telemetry 1000 may include data that should not be accessible by the owner. In these illustrative examples, portion 1002 of telemetry 1000 is an example of data that should not be accessible. As depicted, data transmitter 418 may store portion 1002 of telemetry 1000 in storage 1004.

Storage 1004 may be a memory, a storage device, or some other location in which portion 1002 may be stored. In these illustrative examples, portion 1002 may be stored in a log maintained on satellite 114 in FIG. 1. In this manner, portion 1002 is not sent back to the operations center for owner 106.

Figure 11:
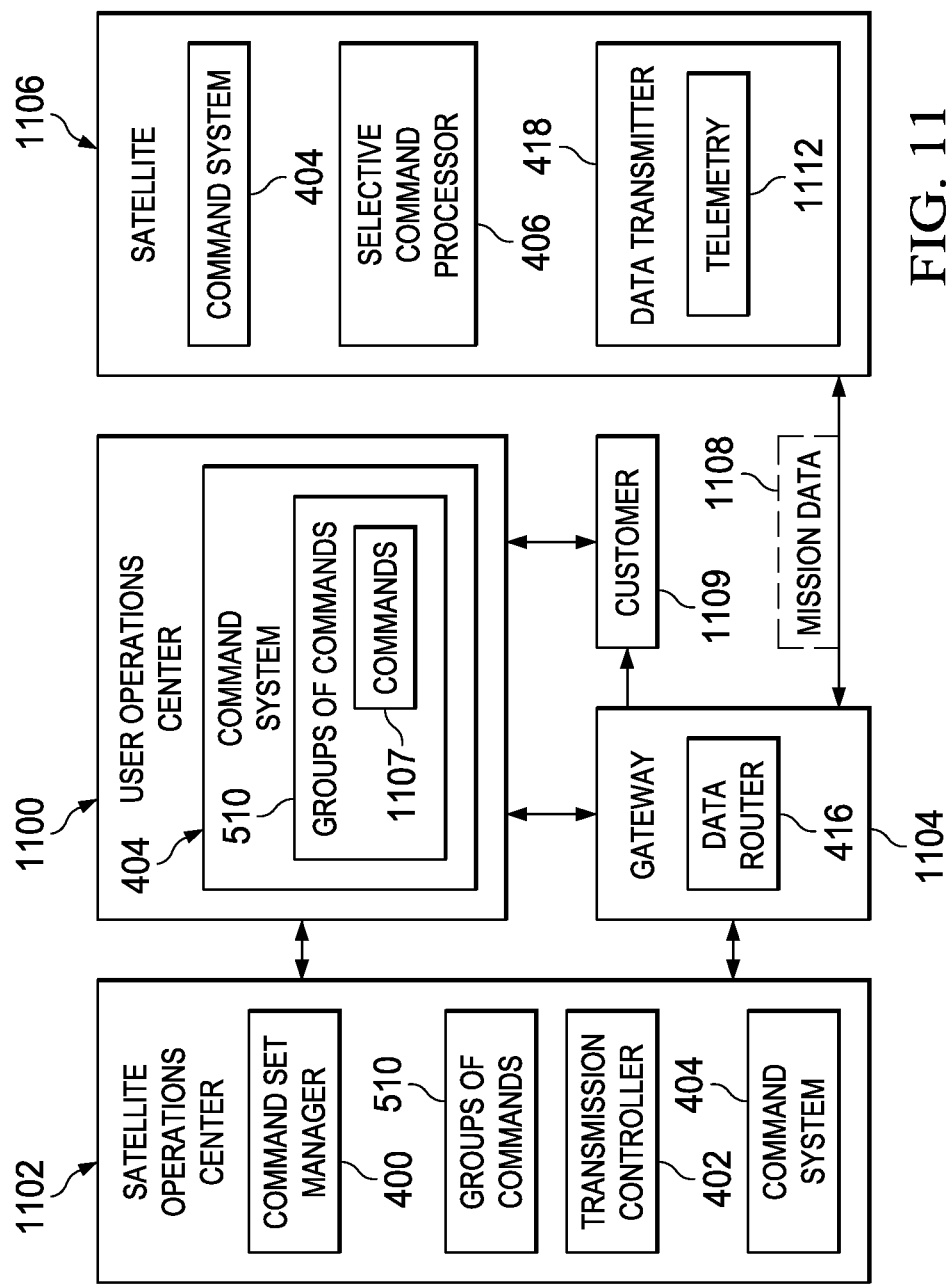
FIG. 11 is an illustration of locations for components in a command management system in accordance with an illustrative embodiment.

Turning next to FIG. 11, an illustration of locations for components in a command management system is depicted in accordance with an illustrative embodiment. In this illustrative example, information management system 120 in FIG. 1 may be implemented in different locations with respect to user operations center 1100, satellite operations center 1102, gateway 1104, and satellite 1106.

For example, command set manager 400 may be implemented in satellite operations center 1102. Command set manager 400 distributes groups of commands 510 to satellite operations center 1102 and user operations center 1100. Of course, command set manager 400 may be located at other locations. For example, command set manager 400 may be located at a third party that manages commands used in satellite operations center 1102 and user operations center 1100.

In this illustrative example, transmission controller 402 also may be implemented in satellite operations center 1102. Transmission controller 402 determines whether commands may be sent to satellite 1106 by user operations center 1100 or by satellite operations center 1102 in this illustrative example.

Command system 404 is located in user operations center 1100, satellite operations center 1102, and satellite 1106 in this illustrative example. The use of the same reference numeral for command system 404 in the different blocks indicates the presence of command system 404 in those components.

In user operations center 1100, command system 404 may encrypt commands 1107 from groups of commands 510. In satellite operations center 1102, command system 404 logs commands 1107 received from user operations center 1100 to satellite 1106.

At satellite 1106, command system 404 may selectively decrypt commands 1107 received from user operations center 1100 in satellite operations center 1102. Selective command processor 406 also is located in satellite 1106 in this example.

Additionally, data router 416 may be located in gateway 1104 to selectively direct mission data 1108 generated by satellite 1106. For example, data router 416 may send mission data 1108 to user operations center 1100, customer 1109, or both in a manner that does not pass through satellite operations center 1102.

Data transmitter 418 may be implemented in satellite 1106. Data transmitter 418 selectively sends telemetry 1112 back to satellite operations center 1102 through gateway 1104. Data transmitter 418 may hold telemetry 1112 on satellite 1106 that should not pass to satellite operations center 1102. In other words, if portions of telemetry 1112 should not be accessible by satellite operations center 1102, those portions of telemetry 1112 may be stored on satellite 1106.

In some illustrative examples, data transmitter 418 may encrypt the portion of telemetry 1112 that satellite operations center 1102 should not access. The encryption system used is the encryption system for a particular user at user operations center 1100. In this manner, the use of one or more of these different components may reduce the possibility that unintended operations of satellite 1106 may occur by unintended operators.

Figure 12:
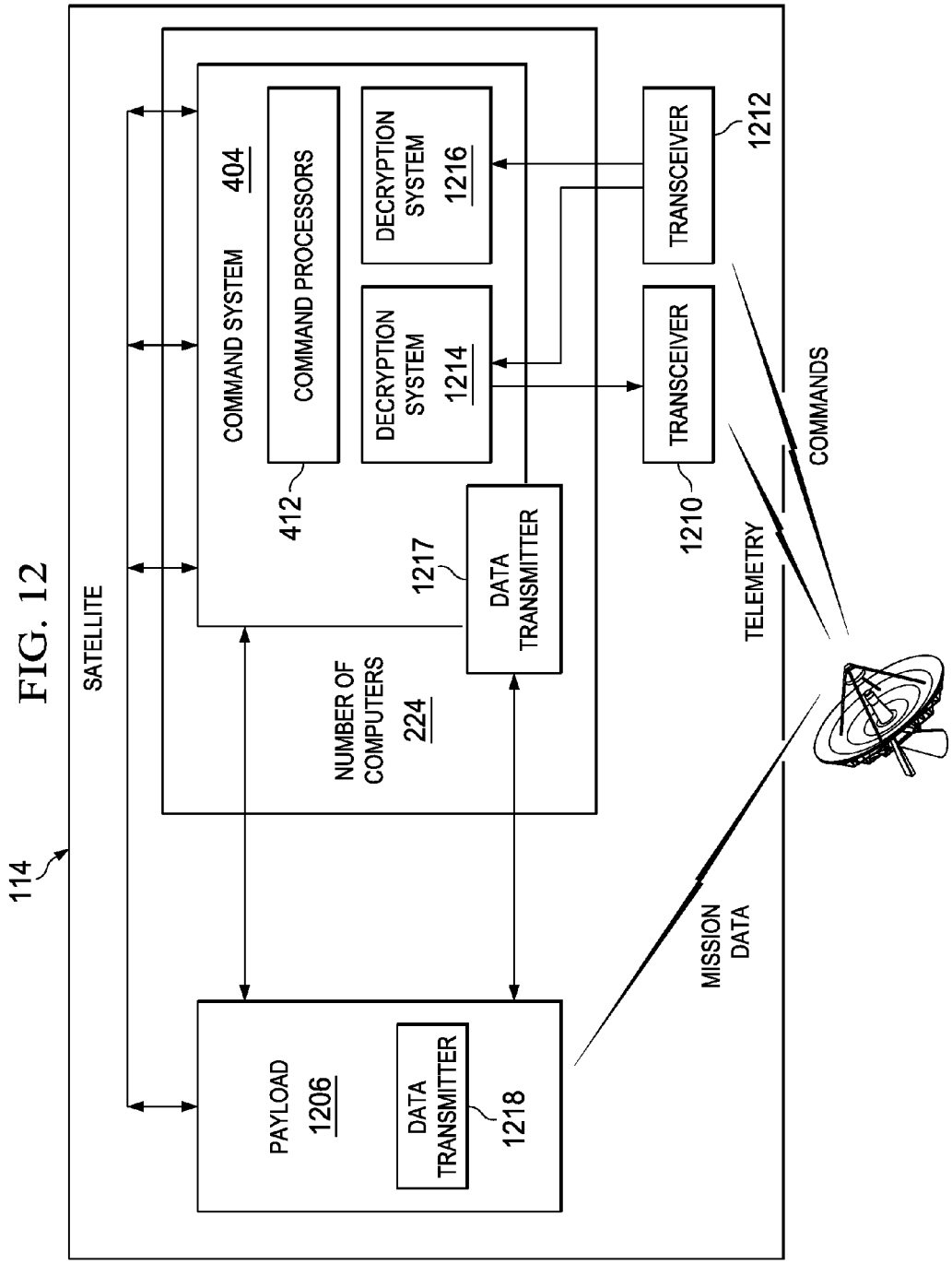
FIG. 12 is an illustration of an implementation of a satellite environment in accordance with an illustrative embodiment.

Turning next to FIG. 12, an illustration of an implementation of a satellite environment is depicted in accordance with an illustrative embodiment. In this illustrative example, satellite 114 includes command system 404, which may be located in number of computers 224, and includes command processors 412. These components are examples of implementations for number of computers 224 in FIG. 2.

In this illustrative example, satellite 114 also includes payload 1206, transceiver 1210, and transceiver 1212. Transceiver 1212 receives commands. Transceiver 1210 sends telemetry. In this illustrative example, the commands are sent to command processors 412 in command system 404. Command processors 412 include decryption system 1214 and decryption system 1216.

Each command sent to command processors 412 may be assigned to a different operator. Further, each command processor in command processors 412 may be assigned to a different operator in operators 104 in FIG. 1. For example, one command processor in command processors 412 may be assigned to owner 106, while another command processor in command processors 412 is assigned to a customer in number of customers 108 in FIG. 1. Each of these command processors only processes commands assigned to that processor.

As depicted, decryption system 1214 is configured to decrypt commands encrypted using one type of encryption, while decryption system 1216 is configured to decrypt commands encrypted using a different type of encryption. The commands may be processed differently based on selected processors, encryption keys, encryption algorithms, or a combination of these in these depicted examples.

In other illustrative examples, decryption system 1214 may decrypt commands encrypted using the same type of encryption. In this case, conflicts may be avoided by routing a command received from an operator to the command processor assigned to the operator that sent the command.

If a decryption system in command processors 412 is able to decrypt a command, the command is then processed by the command processor associated with the decryption system. Otherwise, the command is ignored by that command processor.

Command processors 412 may process commands 128 in FIG. 1 based on the type of command. Some types of commands may be given a priority over other types of commands. For example, commands that are longer in length may be buffered until those commands are completed before processing. Commands that do not require buffering may be processed even though another command is being buffered.

In the illustrative examples, even if the commands have the same sizes, one type of command may be buffered, while the other type of command is not buffered. As a result, a command of a first type received may always be buffered, while a command of a second type is not buffered. If a command of the second type is received at substantially the same time as a command of the first type, the command that is not buffered will be performed prior to the command that is buffered.

Of course, other mechanisms may be used to provide priority between commands 128. For example, priority for commands 128 may be based on command bit selection, resource selection, processor selection, and other suitable factors. In this manner, commands from one operator may be given priority over commands from another operator.

In these illustrative examples, data transmitter 1217 is located in number of computers 224, and data transmitter 1218 is located in payload 1206. Data transmitter 1217 and data transmitter 1218 manage the transmission of telemetry data by satellite 114. These components may hide and/or encrypt telemetry. Telemetry that should not be seen by certain parties may be untransmitted in these illustrative examples. In other examples, the telemetry may be encrypted using the type of encryption for the particular operator.

In this manner, portions of the telemetry that should not be accessed by a particular operator, such as an owner, may be hidden from the operator. This hiding may occur through not transmitting the telemetry or by encrypting the telemetry using an encryption system not used by the owner.

In one illustrative example, data transmitter 1217 and data transmitter 1218 may prevent telemetry from being transmitted from satellite 114 when commands 128 are received in an encrypted form. When commands 128 are received in an unencrypted form, data transmitter 1217 and data transmitter 1218 allow the telemetry to be sent by the antenna. In these illustrative examples, a customer may send encrypted commands, while the owner may send unencrypted commands. Other mechanisms may be used to determine whether telemetry is hidden by data transmitter 1217 and data transmitter 1218. For example, data transmitter 1217 and data transmitter 1218 may determine whether to transmit the telemetry based on the operator that sent the command that resulted in the telemetry being generated, the specific command sent, and other suitable factors.

As yet another example, whether telemetry is sent may be based on what resource in resources 112 in FIG. 1 is generated for the telemetry. Whether the telemetry is sent also may be based on what type of telemetry is present. For example, if the telemetry is temperature data, the telemetry may be sent. If the telemetry is about a position of an antenna assigned to a customer, the telemetry may not be sent. This management of telemetry may be used to maintain a desired level of security for a customer.

As depicted, data transmitter 1218 in payload 1206 also transmits mission data in these illustrative examples. In this illustrative example, data transmitter 1218 directly transmits the mission data without the need to send the mission data through transceiver 1210 or transceiver 1212. When data transmitter 1218 directly transmits mission data, data transmitter 1218 may also include circuits that generate signals to transmit mission data over antennas 222 in FIG. 2. In some illustrative examples, data transmitter 1218 may send mission data through transceiver 1210, transceiver 1212, or both transceiver 1210 and transceiver 1212. In this example, data transmitter 1218 may send the mission data to at least one of transceiver 1210 and transceiver 1212, which in turn generate signals that are configured to be transmitted through antennas 222.

The different illustrative embodiments also recognize and take into account that first information 124 sent to satellite 114 in uplink 125 in FIG. 1 may be encrypted. This encrypted information may be decrypted and processed in satellite 114. Satellite 114 has decryption hardware and software for performing decryption of encrypted data in first information 124.

When first information 124 is decrypted and processed, second information 126 may be returned to one or more of operations centers 105 in FIG. 1. These portions of second information 126 may indicate that first information 124 has been decrypted and processed. In some cases, satellite 114 may not encrypt some or all of second information 126 that is sent in downlink 127, depending on desired level of security 115.

In one illustrative example, different parts of second information 126 may be encrypted using different keys. For example, a first part of second information 126 may be encrypted using a first encryption key for a first customer, while a second part of second information 126 may be encrypted using a second encryption key for a second customer. In still other illustrative examples, a portion of second information 126 also may be unencrypted.

When second information 126 is unencrypted, this information may be surreptitiously viewed by another party. In other words, a third party may be able to intercept and read second information 126 in downlink 127 from satellite 114 to one of operations centers 105.

For example, a customer may send commands 128 to satellite 114 to perform operations, such as positioning an antenna on satellite 114. Commands 128 are sent in an encrypted form. When commands 128 are processed, some of commands 128 may be sent back as telemetry in second information 126 to an operations center in one of operations centers 105.

For example, a command is sent back as telemetry when the command has been decrypted and the operation commanded has been performed. In some situations, it may be desirable to keep third parties from knowing what commands have been sent and processed by satellite 114.

The different illustrative embodiments recognize and take into account that when second information 126 is to be sent in downlink 127 and is considered to be confidential, it would be desirable to have an ability to encrypt second information 126. The different illustrative embodiments recognize and take into account that with current satellite architectures, the encryption systems used to encrypt the information are unavailable or unable to encrypt the information for the satellite.

The illustrative embodiments also recognize and take into account that encryption may not be needed or desirable for all of second information 126 sent in downlink 127 to one or more of operations centers 105. Further, in some cases, different portions of second information 126 may be encrypted using different encryption keys. Different encryption keys may be based on the level of security designed for the information, the particular customer, and other suitable factors.

Thus, one or more illustrative embodiments provide a satellite system comprising a communications system and a number of computers. These components are located in a satellite, such as satellite 114, in these illustrative examples. The communications system is configured to receive information and transmit information to a remote platform over a number of communications links from the satellite to the remote platform. The number of computers is configured to identify a block of information for encryption, generate a key from a portion of the block of information, perform a logic operation with the block of information using the key to form a block of encrypted information, and transmit the block of encrypted information to the remote platform, such as one or more of operations centers 105, using the communications system.

Figure 13:
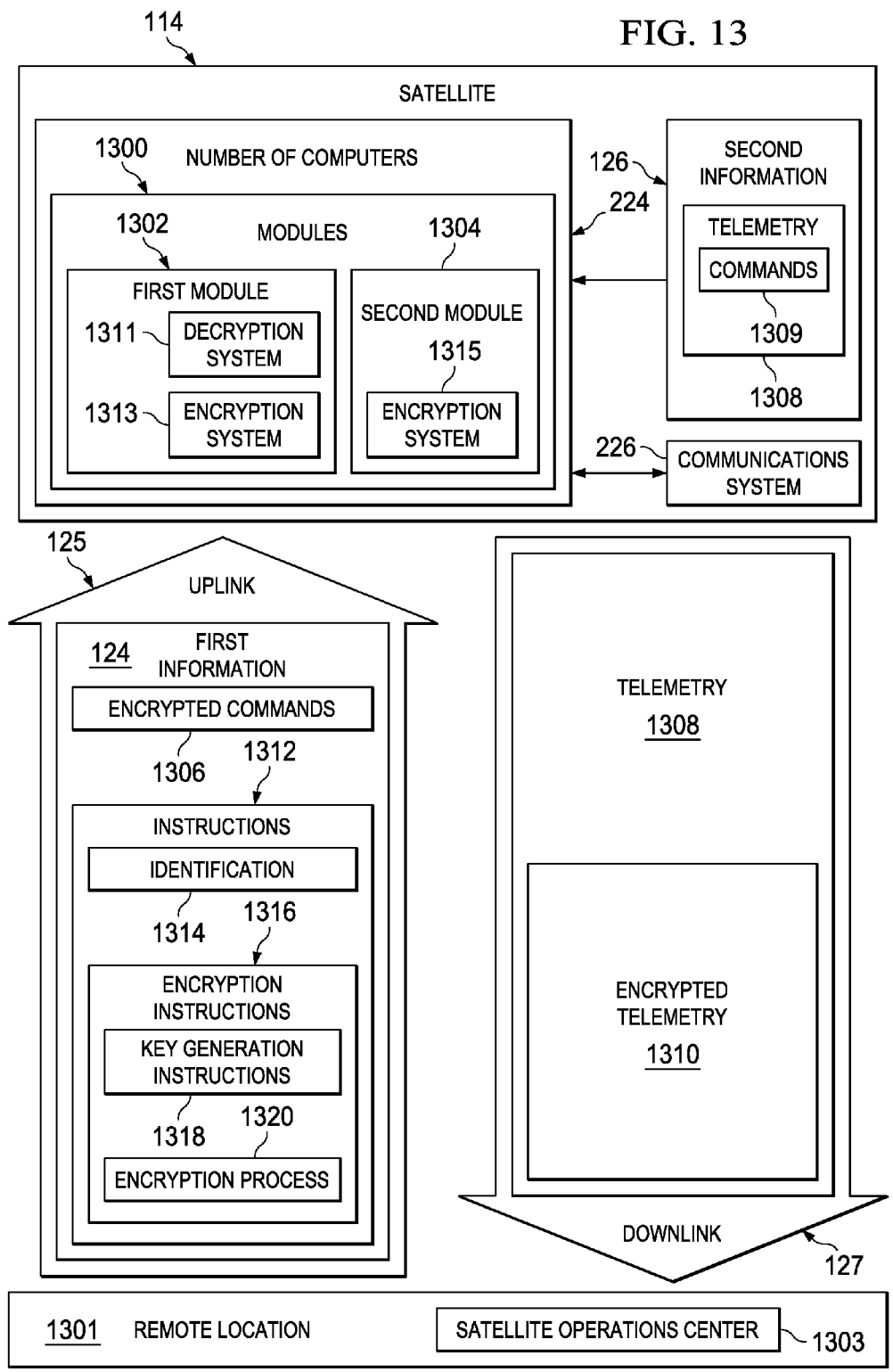
FIG. 13 is an illustration of a block diagram of components used in exchanging encrypted information in accordance with an illustrative embodiment.

With reference next to FIG. 13, an illustration of a block diagram of components used in exchanging encrypted information is depicted in accordance with an illustrative embodiment. In this illustrative example, communications system 226 and number of computers 224 are used to exchange information with remote location 1301 in the form of satellite operations center 1303. Satellite operations center 1303 is an example of an operations center in one of operations centers 105 in FIG. 1. Of course, remote location 1301 may be any location that may be configured to receive second information 126 from satellite 114. For example, remote location 1301 also may be a ship, a space station, an aircraft, an operations center, a facility for a customer, or some other suitable location.

Communications system 226 receives first information 124 in uplink 125. First information 124 is processed by number of computers 224. In particular, number of computers 224 may be partitioned into modules 1300. Modules 1300 are physical modules in these illustrative examples. For example, first module 1302 and second module 1304 in modules 1300 may be computers in number of computers 224. In other illustrative examples, first module 1302 may include a first processor unit in one computer, and second module 1304 may include a second processor unit in the same computer in number of computers 224. In the illustrative examples, first module 1302 and second module 1304 may be command processors, such as command processors 412 in FIG. 4.

In these illustrative examples, when first module 1302 and second module 1304 take the form of command processors, such as command processors 412 in FIG. 4, these two modules may also include other systems and functions found in command processors 412. For example, first module 1302 may include decryption system 1311 and encryption system 1313. Decryption system 1311 may be used to decrypt encrypted information within first information 124. For example, decryption system 1311 may be used to decrypt encrypted commands 1306. Encryption of information may be performed using encryption system 1313.

In this depicted example, second module 1304 may include encryption system 1315. In these illustrative examples, encryption system 1315 may operate using instructions 1312 received in first information 124 through uplink 125. In the illustrative examples, instructions 1312 may or may not be encrypted, depending on the particular implementation.

In these illustrative examples, first information 124 received by number of computers 224 includes encrypted commands 1306. Encrypted commands 1306 are decrypted by first module 1302 to obtain commands 128 in FIG. 1 in a form that can be processed by modules 1300.

As illustrated, commands 128 decrypted by first module 1302 are processed by second module 1304 in these illustrative examples. Second module 1304 processes commands 128 to perform operations in satellite 114. In this illustrative example, processing of commands 128 results in the generation of telemetry 1308. As depicted, a portion of telemetry 1308 may include commands 1309. Commands 1309 are one or more of commands 128 that have been processed by second module 1304. Telemetry 1308 also may include other information about satellite 114. For example, telemetry 1308 may include the position of antennas 222, temperature information generated by sensor system 216 in FIG. 2, and other suitable types of information about satellite 114.

In these illustrative examples, second module 1304 may encrypt a portion of telemetry 1308. For example, second module 1304 may encrypt one or more of commands 1309 that have been processed.

As depicted, the portion of telemetry 1308 encrypted by second module 1304 forms encrypted telemetry 1310. Telemetry 1308 with encrypted telemetry 1310 may be sent back as second information 126 in downlink 127 to one of operations centers 105.

In some cases, second module 1304 may not be pre-configured to encrypt telemetry 1308. In other words, second module 1304 may not include hardware, software, or a combination of the two that are already configured for encrypting telemetry 1308. In other words, encryption system 1315 may not be a special purpose processor or hardware that is configured to encrypt telemetry 1308.

In these instances, telemetry 1308 may still be encrypted by second module 1304. For example, instructions 1312 may be received in first information 124. These instructions may be used by encryption system 1315 in second module 1304 to perform encryption of telemetry 1308. In other words, encryption system 1315 may be a processor unit configured to run program code rather than a special purpose processor or hardware designed for a particular type of encryption, algorithm, or process. The program code may be previously installed or received in instructions 1312.

For example, instructions 1312 may identify what portions of second information 126 should be encrypted. For example, instructions 1312 may include identification 1314, which identifies one or more of commands 128 in telemetry 1308 that should be encrypted to form encrypted telemetry 1310.

Further, instructions 1312 also may include encryption instructions 1316 that identify how the encryption of telemetry 1308 should be performed. For example, encryption instructions 1316 may include key generation instructions 1318. Further, encryption instructions 1316 also may include encryption process 1320. Encryption process 1320 identifies how a key generated using key generation instructions 1318 may be applied to commands identified using identification 1314.

The encryption performed using instructions 1312 may be performed using software for second module 1304. In other words, instructions 1312 may be program code sent to satellite 114 for use by second module 1304. A processor unit in second module 1304 using instructions 1312 may then become encryption system 1315. In other illustrative examples, program code may already be present in second module 1304 for encryption, and instructions 1312 may provide parameters for the software run by encryption system 1315 in second module 1304.

Instructions 1312 may be sent to second module 1304 after satellite 114 is already in orbit. Instructions 1312 may be sent to second module 1304 directly or through first module 1302.

The configuration of modules 1300 may be especially useful when different modules are under the control of different operators in operators 104. For example, first module 1302 may be controlled by owner 106, and second module 1304 may be controlled by customer 500 in number of customers 508 in FIG. 5. In other illustrative examples, commands may be received by owner 106 from customer 500. Owner 106 may send the commands up to first module 1302 for processing by second module 1304.

In this example, commands to control second portion 506 of resources 112 in FIG. 5 assigned to customer 500 as encrypted commands 1306 may be received from an operations center in operations centers 105 operated by owner 106 in response to requests or commands being received from customer 500. Commands unencrypted from encrypted commands 1306 by first module 1302 are sent to second module 1304 for processing. The results of processing these commands form telemetry 1308. Telemetry 1308 resulting from processing commands received from first module 1302 may be selectively encrypted when sent in downlink 127.

In some cases, customer 500 may not care whether telemetry 1308 is encrypted in downlink 127. For example, customer 500 may be a commercial customer. For example, customer 500 may send commands 128 to point antennas 222 that are part of second portion 506 of resources 112 assigned to customer 500 to a particular location to obtain images or video for a commercial purpose. In other illustrative examples, antennas 222 may relay data or other information in the direction in which antennas 222 are pointed. The data and other information may not be considered confidential.

With this example, customer 500 may not be concerned as to whether other parties are able to determine where antennas 222 have been moved in response to commands 128. Telemetry 1308 generated from these commands does not need to be encrypted.

In other illustrative examples, customer 500 may be a government entity. With this example, customer 500 may reposition antennas 222 to perform surveillance of a particular location. Customer 500, as a government entity, also may reposition antennas 222 to relay secure or confidential communications to different endpoints. These endpoints may be, for example, a moving aircraft, troops on the ground, and other suitable endpoints. With this example, customer 500 does not wish to have third parties identifying the positions or changes in positions of antennas 222.

With this particular example, it is undesirable to send telemetry 1308 in downlink 127 without encryption. One or more illustrative embodiments may be used to encrypt at least a portion of telemetry 1308 to form encrypted telemetry 1310 and send that telemetry in downlink 127. In this manner, portions of telemetry 1308, including commands 1309, may be sent as encrypted telemetry 1310 such that the commands may not be easily viewed by other parties.

In this manner, one or more illustrative embodiments may be used to encrypt telemetry 1308 for particular customers. For example, when more than one customer is present, telemetry for one customer may be unencrypted, while telemetry for another customer may be encrypted, depending on customer requirements and preferences. Further, in other illustrative examples, encryption may be performed for multiple customers. The encryption may be performed using different keys for different customers in these illustrative examples.

Figure 14:
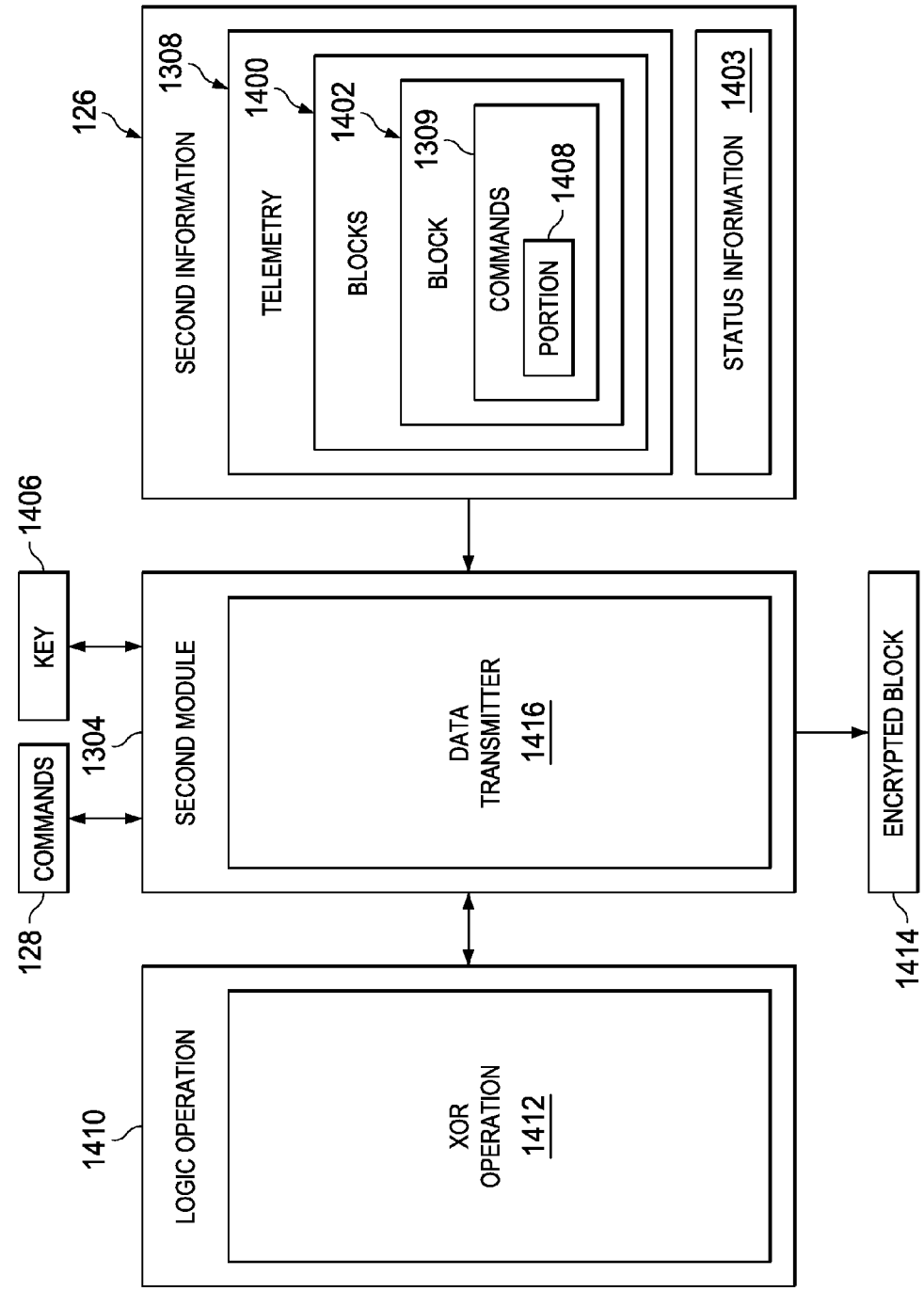
FIG. 14 is an illustration of a block diagram of information flow used to encrypt information in accordance with an illustrative embodiment.

With reference now to FIG. 14, an illustration of a block diagram of an information flow used to encrypt information is depicted in accordance with an illustrative embodiment. In this illustrative example, second module 1304 processes commands 128 and receives and/or generates second information 126. For example, second information 126 may be received from different components within satellite 114 in FIG. 1. Second information 126 also may be generated by second module 1304. Second module 1304 includes data transmitter 1416. Data transmitter 1416 is configured to transmit second information 126 in downlink 127.

In this illustrative example, second information 126 includes telemetry 1308. As depicted, telemetry 1308 may be comprised of blocks 1400. Telemetry 1308 may include, for example, commands 128 processed by second module 1304. These commands may include commands that have been executed, commands that have been rejected for execution, commands that have failed to execute as desired, and other suitable types of commands that are processed by second module 1304.

In other words, every command received by second module 1304 for processing is included in telemetry 1308 in these illustrative examples. When the command is included in telemetry 1308, a status of the command is included. This status may indicate the result of second module 1304 receiving the command for processing. For example, if a command received for processing is an incorrect command, the command may be rejected. An example of this type of command is a command that moves a non-existent antenna in satellite 114. This command is included in telemetry 1308 along with an indication that the command was rejected.

Encryption system 1315 in second module 1304 in FIG. 13 identifies a block that should be encrypted. For example, second module 1304 identifies block 1402 in blocks 1400 of second information 126. Block 1402 may be identified using identification 1314 in instructions 1312 in FIG. 13. In these illustrative examples, block 1402 may include commands 1309. Commands 1309 are commands in commands 128 that have been processed by second module 1304.

In these illustrative examples, commands 1309 in telemetry 1308 are commands received from first module 1302 in FIG. 13 for processing by second module 1304. For example, commands 1309 may be commands that have been decrypted and used to perform operations.

In other words, commands 1309 include all commands received from first module 1302, regardless of the result of processing. For example, commands 1309 may include commands that are successfully processed, commands that were identified as being incorrect commands, commands that resulted in an error in execution, and other results from processing the commands.

Status information 1403 may be associated with commands 1309 to indicate the status of commands 1309. Further, status information 1403 also may be encrypted along with commands 1309 to form encrypted telemetry 1310 in FIG. 13.

In this illustrative example, encryption system 1315 in second module 1304 generates key 1406 using portion 1408 of block 1402 of second information 126. In the illustrative examples, the manner in which key 1406 is generated may be performed according to instructions 1312.

Key 1406 is an encryption key in this illustrative example. The generation of key 1406 is performed using key generation instructions 1318 in encryption instructions 1316. Key generation instructions 1318 identify how key 1406 is to be generated.

For example, key generation instructions 1318 may identify portion 1408 of block 1402 that is to be used to generate key 1406. For example, portion 1408 may be a word in block 1402. More specifically, portion 1408 may be a command from commands 128 that is included in telemetry 1308. In other illustrative examples, key generation instructions 1318 may identify portion 1408 of block 1402 as a portion of telemetry 1308 that is not to be encrypted. In other words, key 1406 may be generated from any portion of telemetry 1308, regardless of whether that portion is to be encrypted for transmission.

Second module 1304 then identifies logic operation 1410. Logic operation 1410 may be identified using encryption process 1320 in encryption instructions 1316 in FIG. 13. For example, logic operation 1410 may be an operation in which a Boolean operation is performed.

In the illustrative examples, logic operation 1410 may be conjunction, disjunction, and negation. Logic operation 1410 may be selected from at least one of XOR, NOR, AND, NAND, OR, and other suitable types of logic operations. These operations may be implemented using software, hardware, or some combination thereof. In this illustrative example, logic operation 1410 is XOR operation 1412.

After logic operation 1410 is performed on block 1402, encrypted block 1414 is formed. In other words, block 1402 becomes a block of encrypted information. Second information 126 with encrypted block 1414 may now be transmitted to satellite operations center 1303 in downlink 127.

In these illustrative examples, blocks 1400 may take a number of different forms. For example, blocks 1400 may all be the same size. In another example, blocks 1400 may take the form of words. These words may be, for example, without limitation, 16 bit words, 32 bit words, 64 bit words, and other suitable sizes.

Figure 15:
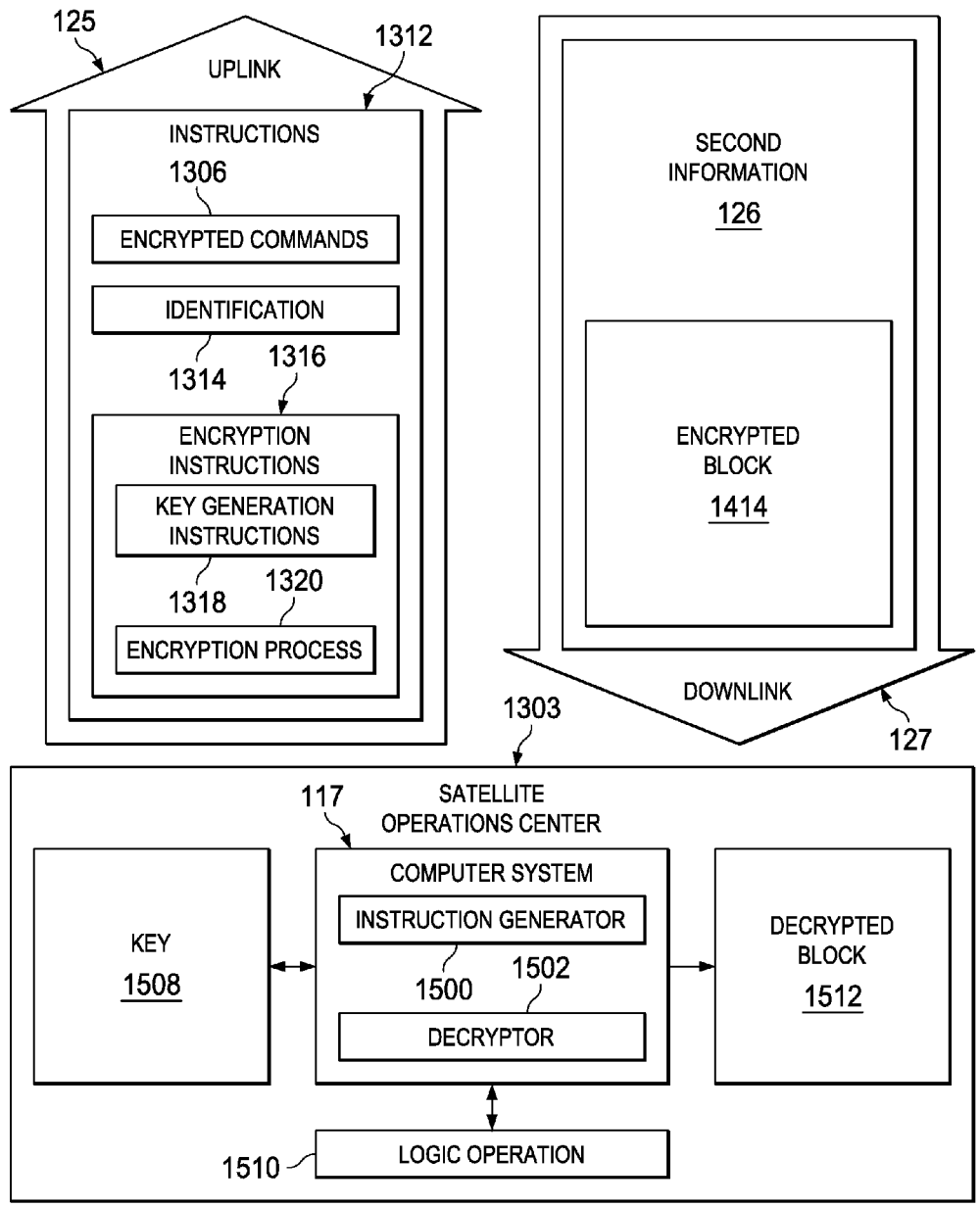
FIG. 15 is an illustration of a block diagram of information flow used to decrypt information in accordance with an illustrative embodiment.

Turning now to FIG. 15, an illustration of a block diagram of an information flow used to decrypt information is depicted in accordance with an illustrative embodiment. In this illustrative example, instruction generator 1500 in computer system 117 is configured to generate instructions 1312 sent in uplink 125 from satellite operations center 1303. A portion or all of computer system 117 may be located in the operations center in satellite operations center 1303.

As depicted, instruction generator 1500 may generate at least one of identification 1314, key generation instructions 1318, and encryption process 1320. In some cases, identification 1314 may be unnecessary and only key generation instructions 1318 and encryption process 1320 for encryption instructions 1316 are generated. In other illustrative examples, encryption instructions 1316 may include key generation instructions 1318 and not encryption process 1320.

Instructions 1312 may be generated each time encrypted commands 1306 are sent to satellite 114 in FIG. 1. In other illustrative examples, instructions 1312 may only be generated once or periodically.

In this illustrative example, computer system 117 also receives second information 126 in downlink 127 at satellite operations center 1303 in operations centers 105 in FIG. 1. As depicted, second information 126 includes encrypted block 1414 in these illustrative examples. Decryptor 1502 in computer system 117 is configured to decrypt encrypted block 1414. Decryptor 1502 may be implemented using hardware, software, or a combination of the two.

As depicted, decryptor 1502 in computer system 117 identifies key 1508. Key 1508 is a decryption key in these illustrative examples. Depending on the implementation, key 1508 may be the same as key 1406 in FIG. 14.

Key 1508 may be identified in a number of different ways. For example, key 1508 may be generated based on key generation instructions 1318 in encryption instructions 1316. Commands 128 sent in uplink 125 are returned in downlink 127 as commands 1309 in telemetry 1308 in FIG. 13 in the illustrative examples.

As a result, a particular command in commands 128 may be selected for use to generate key 1406 for encrypting telemetry 1308. This same command may be used to generate key 1508 for decrypting telemetry 1308 when received by decryptor 1502 in satellite operations center 1303.

In other illustrative examples, key 1508 may be passed to data transmitter 1416 in first information 124 for use as key 1406 in performing logic operation 1410 in FIG. 14. For example, key 1508 may be included in encryption instructions 1316 in place of key generation instructions 1318. In still other illustrative examples, key 1406 may be received within second information 126 and used by decryptor 1502 as key 1508.

For example, key generation instructions 1318 in encryption instructions 1316 may identify a particular word in block 1402 that is to be used to generate key 1406. When logic operation 1410 takes the form of XOR operation 1412 in FIG. 14, key 1508 is identical to key 1406. As a result, the same command identified in encryption instructions 1316 may be used to generate key 1508.

Key 1508 is used by decryptor 1502 to decrypt encrypted block 1414. In this illustrative example, computer system 117 performs logic operation 1510 on encrypted block 1414. Performing logic operation 1510 on encrypted block 1414 results in encrypted block 1414 becoming decrypted block 1512.

Information in decrypted block 1512 may now be used. In particular, if decrypted block 1512 includes commands 1309, an identification of commands that were successfully processed may be identified from decrypted block 1512.

The illustration of the different components shown in FIGS. 13-15 are not meant to imply physical or architectural limitations to the manner in which an illustrative embodiment may be implemented. For example, other mechanisms may be used for identifying keys for use in encrypting telemetry 1308. For example, a trusted platform module (TPM) may be present in a module or computer system. In these illustrative examples, the trusted platform module is a processor that can store keys. When a trusted platform module is present, keys pre-stored in the module may be used by data transmitter 1416 in second module 1304 in the illustrative examples.

In another illustrative example, instructions 1312 may already be present on satellite 114. For example, instructions 1312 may be resident in second module 1304 in modules 1300.

FIGS. 16-20 illustrate different processes for generating keys for encrypting data in accordance with an illustrative embodiment. These processes may be implemented using second module 1304 in the depicted examples. The generation of keys in these figures may be performed using key generation instructions 1318 in encryption instructions 1316 in the illustrative examples.

Figure 16:
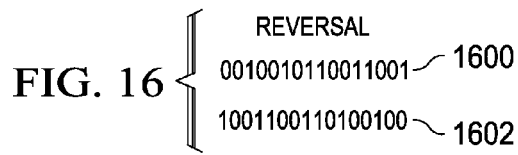
FIGS. 16-20 illustrate different processes for generating keys for encrypting data in accordance with an illustrative embodiment.

With reference first to FIG. 16, an illustration of a key generation is depicted in accordance with an illustrative embodiment. In this illustrative example, word 1600 is an example of a portion of a block of information that may be used to generate key 1602. Key 1602 is an example of key 1406. In these illustrative examples, a word is a fixed length string of data that is processed as a unit.

As depicted, reversal is performed on word 1600 to generate key 1602. In this illustrative example, key 1602 is formed by reversing the order of bits in word 1600.

Figure 17:
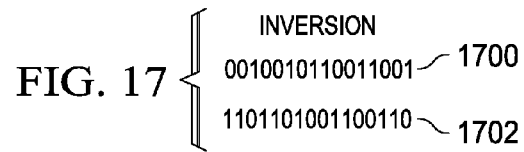

Turning now to FIG. 17, an illustration of a key generation is depicted in accordance with an illustrative embodiment. In this illustrative example, word 1700 is an example of a portion of a block of data that is used to generate key 1702. Key 1702 is an example of key 1406 in FIG. 14. In this particular example, inversion is used to generate key 1702 from word 1700. Key 1702 is generated by inverting the bit values in word 1700.

Figure 18:
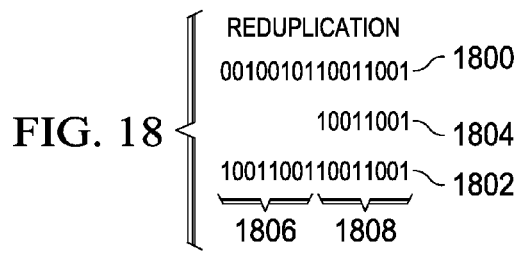

In FIG. 18, another illustration of a key generation is depicted in accordance with an illustrative embodiment. In this illustrative example, word 1800 is an example of a portion of a block of data that is used to generate key 1802. Key 1802 is an example of key 1406 in FIG. 14. In this illustrative example, reduplication is performed to generate key 1802 from word 1800.

Bits 1804 are selected in word 1800. In this particular example, bits 1804 are half of the number of bits in word 1800. Bits 1804 are the eight right-most bits in word 1800 in this illustrative example. By reduplicating bits 1804, key 1802 is generated.

In this illustrative example, key 1802 has section 1806 and section 1808. These sections are identical to each other. In other words, section 1806 and section 1808 both have the same bits from bits 1804 in word 1800.

Figure 19:
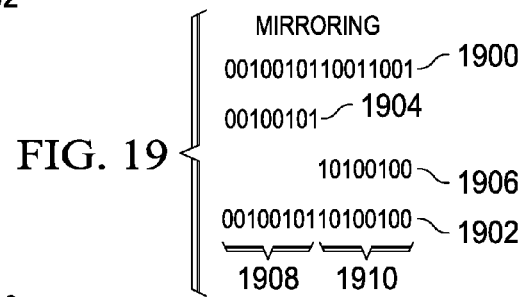

Turning now to FIG. 19, another illustration of a key generation is depicted in accordance with an illustrative embodiment. In this illustrative example, word 1900 is an example of a portion of a block of data that is used to generate key 1902. Key 1902 is an example of key 1406 in FIG. 14. In this illustrative example, mirroring is used to generate key 1902 from word 1900.

As depicted, bits 1904 are selected from word 1900. Bits 1904 are the eight left-most bits from word 1900 in this illustrative example. Bits 1906 are generated from bits 1904. Bits 1906 are generated by reversing bits 1904. In other words, the first bit in bits 1904 becomes the last bit in bits 1906. The second bit in bits 1904 becomes the second to last bit in bits 1906. This change in the order of bits is performed until all of bits 1904 have been reversed in order to form bits 1906. Bits 1904 and bits 1906 are then combined to form key 1902.

In this illustrative example, section 1908 and section 1910 in key 1902 correspond to bits 1904 and bits 1906, respectively. Section 1908 and section 1910 are mirror images of each other.

Figure 20:
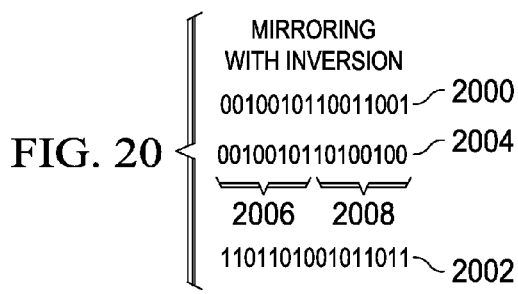

Turning now to FIG. 20, an illustration of a key generation is depicted in accordance with an illustrative embodiment. In this illustrative example, word 2000 is an example of a portion of a block of data that is used to generate key 2002. Key 2002 is an example of key 1406 in FIG. 14.

In this example, mirroring with inversion is performed on word 2000 to form key 2002. Mirroring of word 2000 is performed to form word 2004. Mirroring of word 2000 is performed in the same manner as described in FIG. 19. In this example, section 2006 and section 2008 in word 2004 are symmetrical to each other. Inversion of the bits in word 2004 is performed to form key 2002.

The different processes illustrated for generating keys in FIGS. 16-20 are presented for purposes of illustrating some processes for generating keys and are not meant to be limiting or exhaustive. For example, instead of performing mirroring followed by inversion in FIG. 20, a key may be generated by performing inversion followed by mirroring. Further, the illustrative examples perform operations to generate keys using 8 bit blocks. Other sized blocks may be used in other illustrative examples. For example, 4 bits may be reduplicated four times rather than reduplicating 8 bits twice.

Figure 21:
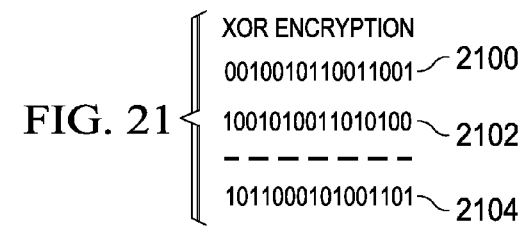
FIG. 21 is an illustration of a process for encryption of information in accordance with an illustrative embodiment.

Turning now to FIG. 21, an illustration of a process for encryption of information is depicted in accordance with an illustrative embodiment. The operations for performing the encryption in FIG. 21 may be implemented in second module 1304 in FIG. 13. This encryption may be performed using encryption process 1320 in encryption instructions 1316 in FIG. 13.

In this illustrative example, word 2100 is an example of a word in a block of information. Key 2102 is a key generated from a portion of the block of information.

In this illustrative example, a logic operation is performed on word 2100 using key 2102. In particular, an XOR operation is performed on word 2100 using key 2102. This operation forms encrypted information in the form of encrypted word 2104. Encrypted word 2104 is an example of a word in encrypted block 1414 in FIG. 14.

Figure 22:
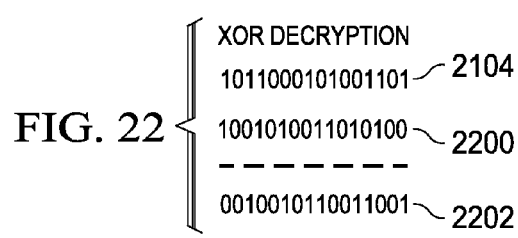
FIG. 22 is an illustration of a process for decryption of information in accordance with an illustrative embodiment.

Turning now to FIG. 22, an illustration of a process for decryption of information is depicted in accordance with an illustrative embodiment. The operations illustrated for performing the decryption in FIG. 22 may be implemented in computer system 117 in FIG. 15.

In this illustrative example, encrypted word 2104 is received by decryptor 1502 in computer system 117 in FIG. 15. Decryptor 1502 identifies key 2200. Key 2200 is an example of key 1508 in FIG. 15. An XOR operation is performed on encrypted word 2104 using key 2200. The result is decrypted word 2202. Decrypted word 2202 is the same word as word 2100 in FIG. 21.

Figure 23:
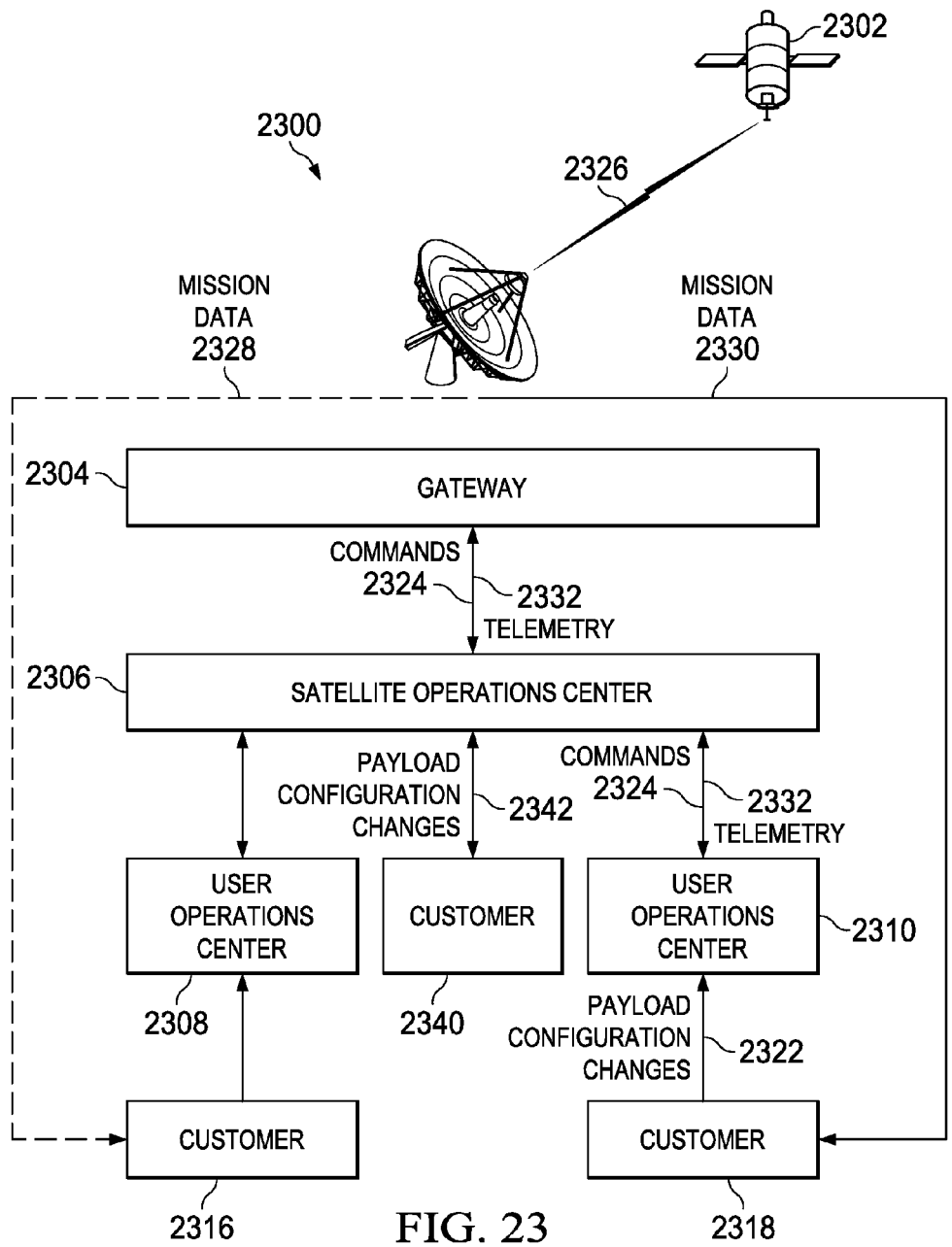
FIG. 23 is an illustration of a satellite environment in accordance with an illustrative embodiment.

Turning now to FIG. 23, an illustration of a satellite environment is depicted in accordance with an illustrative embodiment. In this illustrative example, satellite environment 2300 is an example of one implementation of satellite environment 100 in FIG. 1.

In this illustrative example, satellite environment 2300 includes satellite 2302, gateway 2304, satellite operations center 2306, user operations center 2308, user operations center 2310, customer 2316, customer 2318, and customer 2340.

In these illustrative examples, one customer may operate through user operations center 2308. Another customer may operate through user operations center 2310. In these illustrative examples, an owner of satellite 2302 operates satellite operations center 2306 and gateway 2304.

As depicted, customer 2316 and customer 2318 generate plans and configurations for operating resources in satellite 2302 by the customers. User operations center 2308 and user operations center 2310 are locations where commands are generated after changes in the payload are identified.

Satellite operations center 2306 is configured to forward commands received from user operations center 2308 and user operations center 2310 to satellite 2302 through gateway 2304. Further, satellite operations center 2306 may receive data in the form of telemetry from satellite 2302.

Gateway 2304 is configured to send commands to satellite 2302 and receive telemetry as well as mission data from satellite 2302. Gateway 2304 is configured to send the telemetry to satellite operations center 2306. Mission data is routed to at least one of customer 2316, customer 2318, user operations center 2308, and user operations center 2310.

In one illustrative example, customer 2318 generates payload configuration changes 2322. Payload configuration changes 2322 may affect a configuration of antennas in the payload of satellite 2302. Payload configuration changes 2322 is sent to user operations center 2310. User operations center 2310 creates commands, requests a token, and sends commands 2324 to satellite 2302 through satellite operations center 2306 and gateway 2304 after receiving the token in these illustrative examples. Gateway 2304 communicates with satellite 2302 through communications link 2326 in these illustrative examples.

Mission data received from satellite 2302 through communications link 2326 are routed to the appropriate customer. For example, mission data 2328 is sent to customer 2316. Mission data 2330 is sent to customer 2318.

In these illustrative examples, telemetry 2332 may be sent back to user operations center 2308 or user operations center 2310 through satellite operations center 2306.

In these illustrative examples, commands 2324 may be encrypted. User operations center 2308 and user operations center 2310 may have different types of encryption for their commands. In these illustrative examples, the different types of encryption may be used to avoid collision between commands 2324 sent to satellite 2302.

In another illustrative example, customer 2340 also may access satellite 2302. As depicted, customer 2340 communicates with satellite operations center 2306 without needing a user operations center. In this case, satellite operations center 2306 is configured to generate commands 2324 for customer 2340.

In this illustrative example, customer 2340 sends payload configuration changes 2342 to satellite operations center 2306. In turn, satellite operations center 2306 generates commands 2324 from payload configuration changes 2342. With this configuration, satellite operations center 2306 may partition processing resources in a manner that provides a desired level of security for customer 2340.

The illustration of satellite environment 2300 is only meant as an example of one implementation of satellite environment 100 in FIG. 1. The illustration is not meant to imply limitations to the manner in which different satellite environments may be implemented.

In other illustrative examples, other numbers of users and user operations centers may be present. For example, user operations center 2308 may be omitted. With this example, payload configuration changes from customer 2316 may be sent to user operations center 2310. In other words, two customers may share a single user operations center.

Figure 24:
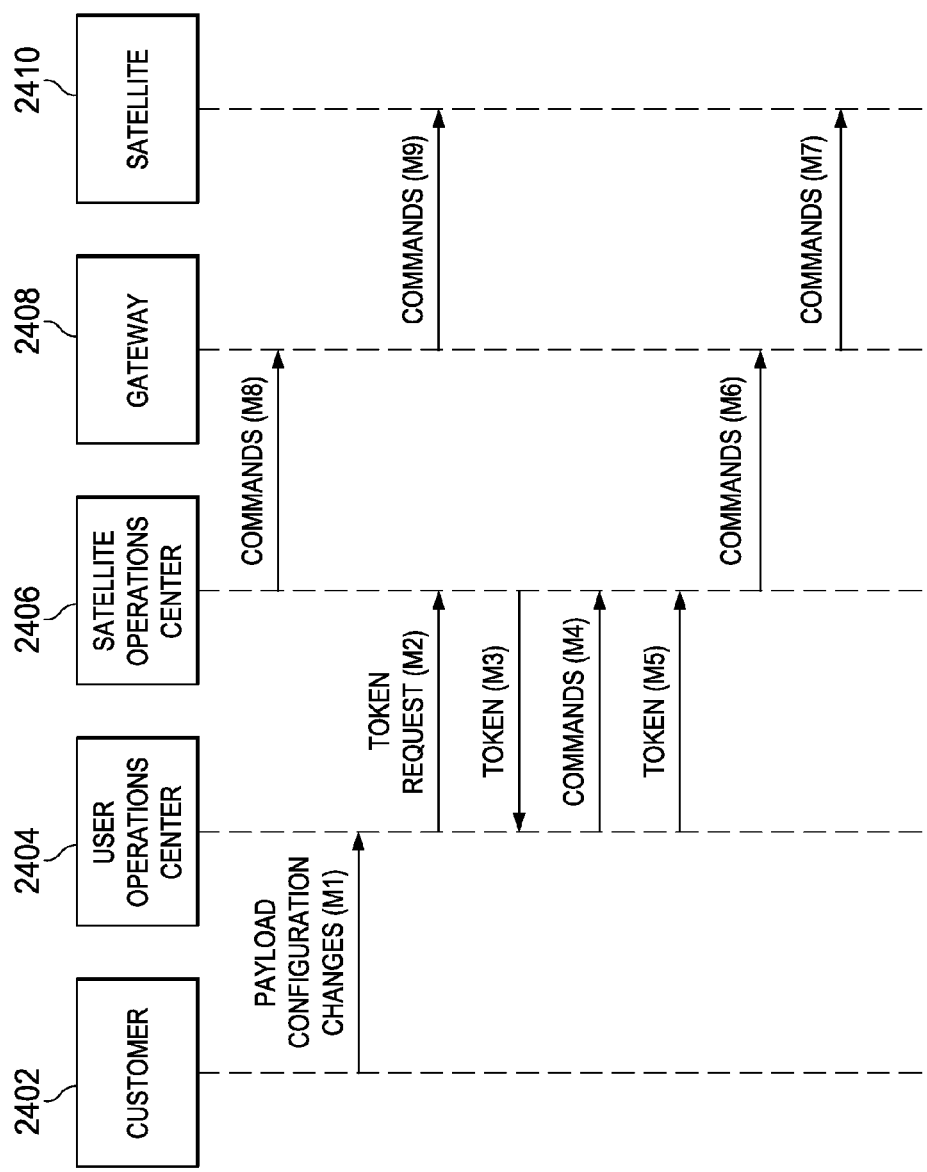
FIG. 24 is an illustration of a message flow diagram for sending commands to a satellite from a user in accordance with an illustrative embodiment.

Turning now to FIG. 24, an illustration of a message flow diagram for sending commands to a satellite from a user is depicted in accordance with an illustrative embodiment. In this example, messages are exchanged between customer 2402, user operations center 2404, satellite operations center 2406, gateway 2408, and satellite 2410.

Customer 2402 may be, for example, customer 2318 in FIG. 23. User operations center 2404 may be user operations center 2310 in FIG. 23. Satellite operations center 2406 may be satellite operations center 2306 in FIG. 23. Satellite 2410 may be satellite 2302 in FIG. 23.

In this illustrative example, the messaging may begin when customer 2402 requests payload configuration changes from user operations center 2404 (message M1). In response to receiving the request for the payload configuration changes, user operations center 2404 sends a token request to satellite operations center 2406 (message M2). The token allows user operations center 2404 to send commands to satellite 2410.

In response to receiving the request for the token from user operations center 2404, satellite operations center 2406 sends the token to user operations center 2404 (message M3).

After receiving the token, user operations center 2404 creates commands and sends the commands to satellite operations center 2406 (message M4). User operations center 2404 also returns the token to satellite operations center 2406 (message M5).

In response to receiving commands from user operations center 2404 in message M4, satellite operations center 2406 sends commands to gateway 2408 for transmission to satellite 2410 (message M6). Thereafter, gateway 2408 sends the commands to satellite 2410 (message M7). In response to receiving the commands from gateway 2408, satellite 2410 performs operations using the commands.

Additionally, commands also may be generated by satellite operations center 2406. These commands may be sent to gateway 2408 (message M8). In other words, if the token is not being held by another operations center, satellite operations center 2406 may send commands to satellite 2410. In these illustrative examples, message M8 may be sent when user operations center 2404 does not have the token. These commands may be different commands from those generated by customer 2402. Gateway 2408 sends the commands to satellite 2410 (message M9). Satellite 2410 then processes the commands to perform operations on resources in satellite 2410.

Figure 25:
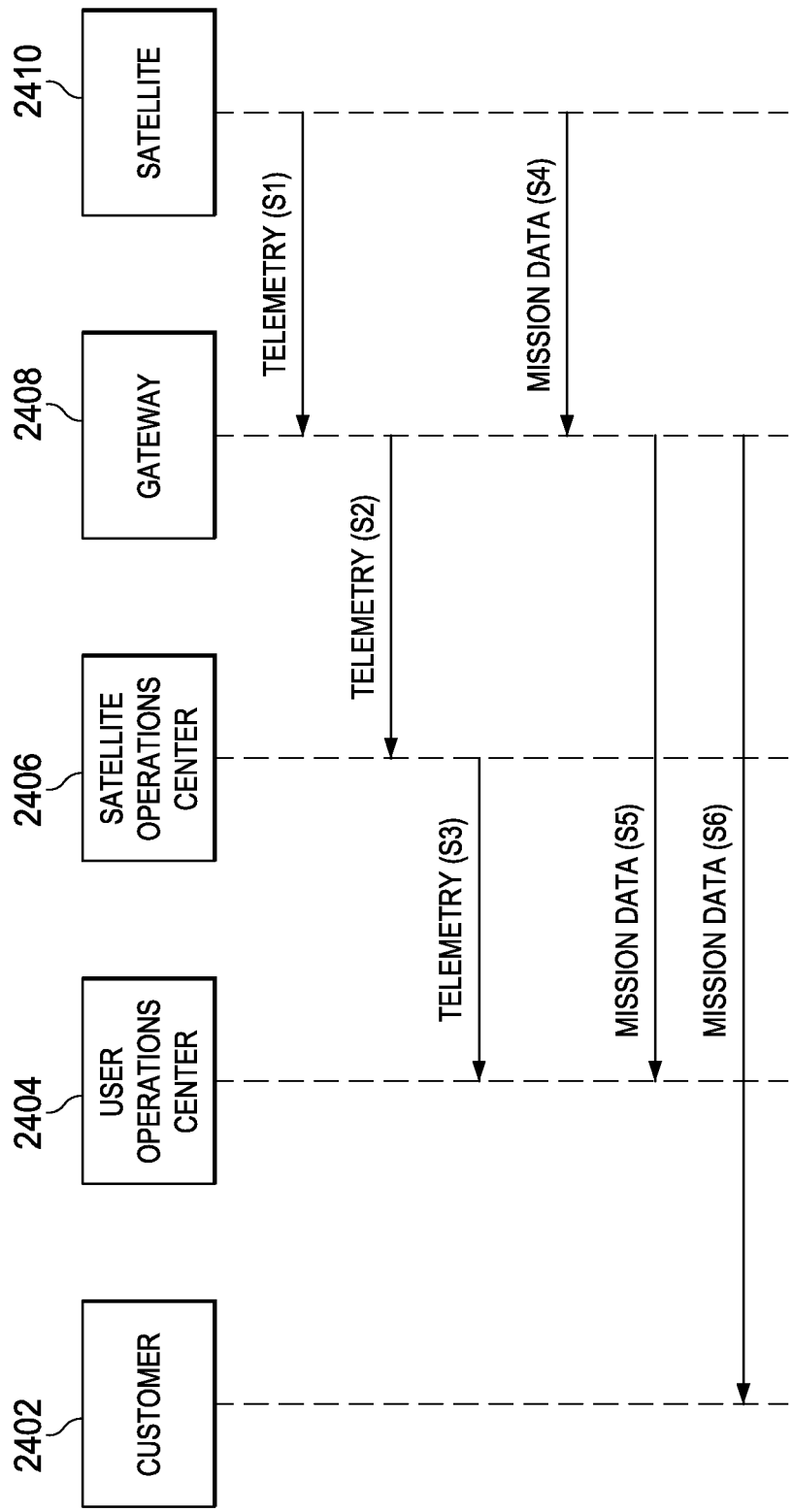
FIG. 25 is an illustration of a message flow diagram from a satellite to operators in accordance with an illustrative embodiment.

Turning to FIG. 25, an illustration of a message flow diagram from a satellite to operators is depicted in accordance with an illustrative embodiment. In this illustrative example, satellite 2410 sends telemetry to gateway 2408 (message S1). Thereafter, gateway 2408 sends telemetry to satellite operations center 2406 (message S2). The telemetry is then sent to user operations center 2404 (message S3).

In this illustrative example, telemetry returned from satellite 2410 passes through satellite operations center 2406. In some cases, the telemetry may not include confidential or sensitive information to the customer. Telemetry that may be sensitive or confidential is not sent by satellite 2410 in these illustrative examples.

Additionally, satellite 2410 also sends mission data to gateway 2408 (message S4). Gateway 2408 sends the mission data to user operations center 2404 (message S5). Gateway 2408 also may send the mission data to customer 2402 (message S6). In some illustrative examples, gateway 2408 may only send mission data to one of customer 2402 and user operations center 2404, depending on the particular implementation. The routing of data may provide a desired level of security for customer 2402. In particular, this type of flow of data may be performed to prevent the owner of satellite operations center 2406 from having access to the data.

In this example, mission data is sent directly to customer 2402 and/or user operations center 2404. This directing of mission data by gateway 2408 bypasses satellite operations center 2406. In this manner, the mission data in message S5 is kept separate and secure from the owner operating satellite operations center 2406 in these illustrative examples.

The illustration of message flow in FIGS. 24 and 25 are examples of one manner in which messages may be sent between different components. Of course, messages may be sent in a different order in some illustrative examples. For example, the token returned in message M5 may be returned at the same time or prior to commands being sent from satellite operations center 2406. As another example, the data and telemetry may be sent at the same time in FIG. 25, although they are shown sequentially in the message flow.

Figure 26:
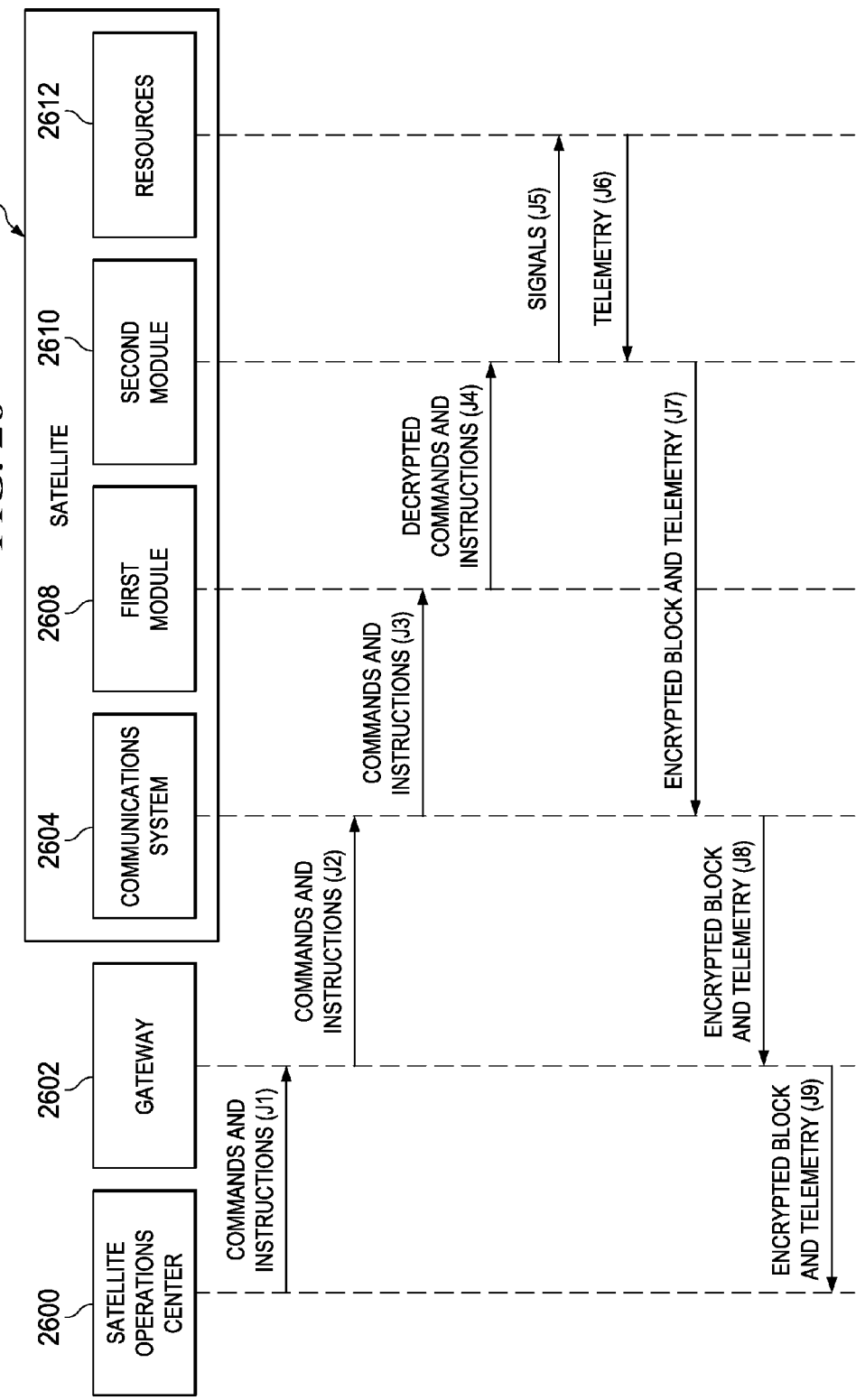
FIG. 26 is an illustration of a message flow diagram for sending first information and second information in accordance with an illustrative embodiment.

Turning now to FIG. 26, an illustration of a message flow diagram for sending first information and second information is depicted in accordance with an illustrative embodiment. In this illustrative example, satellite operations center 2600 sends commands and instructions as part of first information 124 in FIG. 1 to gateway 2602 (message J1). The commands and instructions are sent from gateway 2602 to communications system 2604 in satellite 2606 (message J2). Although communications system 2604 is shown as providing both uplink and downlink capabilities, communications system 2604 may be implemented as separate systems in which one system provides uplink 125 and the other system provides downlink 127 in FIG. 1.

Communications system 2604 sends the commands and instructions to first module 2608 (message J3). First module 2608 may decrypt the commands and instructions and send the decrypted commands and instructions to second module 2610 (message J4). Second module 2610 sends signals to resources 2612 to perform operations based on receiving the commands from first module 2608 (message J5).

In response, second module 2610 receives telemetry from resources 2612 (message J6). Second module 2610 then generates a key using the instructions received from first module 2608. Second module 2610 then identifies a block of information in the telemetry and encrypts the block. Second module 2610 then sends the block of information with the telemetry to communications system 2604 (message J7). In turn, communications system 2604 then sends the block of encrypted information and the telemetry to gateway 2602 (message J8). In turn, gateway 2602 sends the block of encrypted information to satellite operations center 2600 for processing (message J9).

Figure 27:
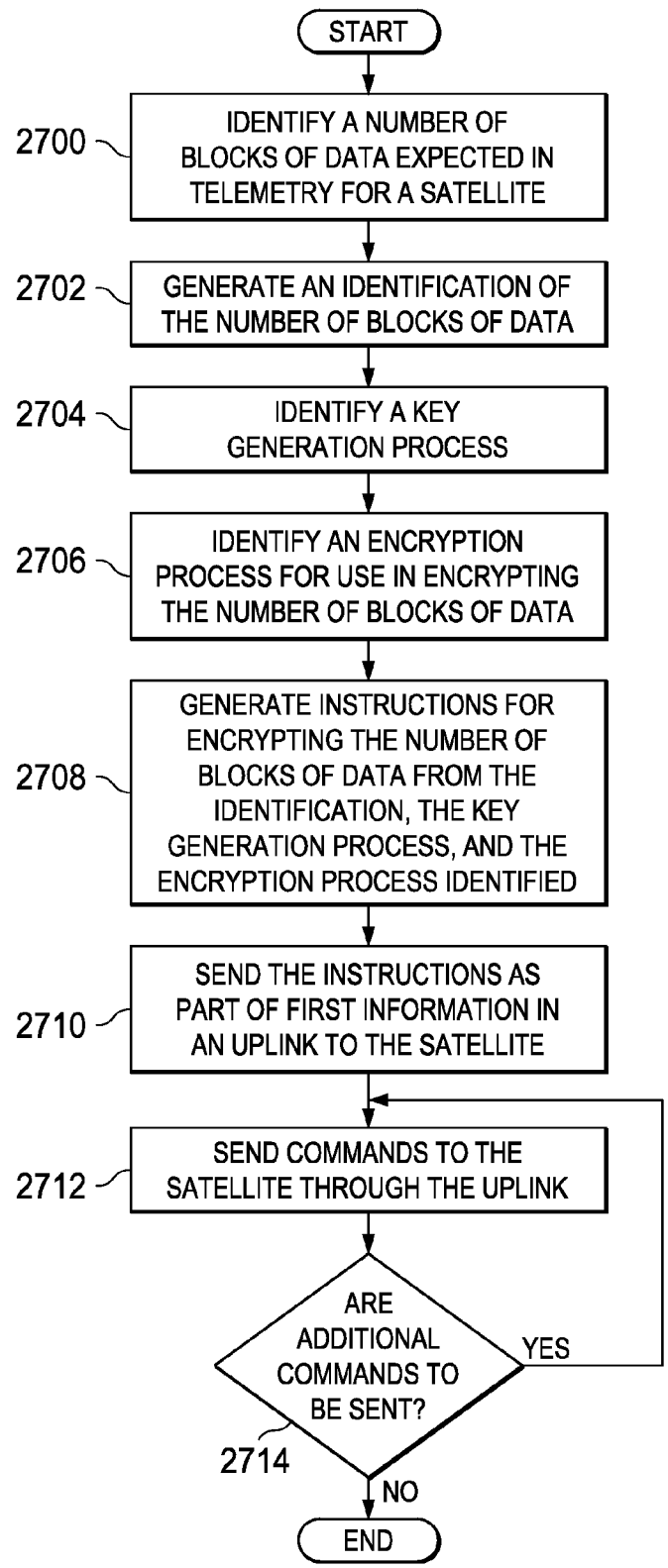
FIG. 27 is an illustration of a flowchart of a process for identifying information for encryption in accordance with an illustrative embodiment.

With reference now to FIG. 27, an illustration of a flowchart of a process for identifying information for encryption is depicted in accordance with an illustrative embodiment. The process illustrated in FIG. 27 may be implemented in a computer system, such as computer system 117 in FIG. 1. In particular, computer system 117 may be located in a satellite operations center, such as satellite operations center 2406 in FIG. 24.

The process begins by identifying a number of blocks of data expected in telemetry for a satellite (operation 2700). The process then generates an identification of the number of blocks of data (operation 2702). The process then identifies a key generation process (operation 2704) and an encryption process for use in encrypting the number of blocks of data (operation 2706).

The process then generates instructions for encrypting the number of blocks of data from the identification, the key generation process, and the encryption process identified (operation 2708). The process then sends the instructions as part of first information in an uplink to the satellite (operation 2710).

The process then sends commands to the satellite through the uplink (operation 2712). A determination is made as to whether additional commands are to be sent (operation 2714). If additional commands are to be sent, the process returns to operation 2712. Otherwise, the process terminates.

With reference now to FIG. 28, an illustration of a flowchart of a process for encrypting information is depicted in accordance with an illustrative embodiment. The process illustrated in FIG. 28 may be implemented in number of computers 224 in FIG. 2.

The process begins by receiving instructions for encrypting data (operation 2800). These instructions may include, for example, an identification of blocks of data to be encrypted and encryption instructions. The encryption instructions may include instructions for key generation and for an encryption process.

The process then receives commands for processing (operation 2802). Thereafter, the process forms operations using the commands (operation 2804). The process then identifies telemetry in response to processing the commands (operation 2806). The telemetry may be data received from resources, commands processed, or a combination of the two.

Thereafter, the process identifies a block of information containing one or more of the commands (operation 2808). The process then generates a key based on a portion of the block of information (operation 2810). Thereafter, the process performs a logic operation on the block of information using the key (operation 2812). The process then sends the block of information along with other telemetry as second information in a downlink to a satellite operations center (operation 2814), with the process terminating thereafter.

Turning now to FIG. 29, an illustration of a flowchart of a process for decrypting information is depicted in accordance with an illustrative embodiment. The process illustrated in FIG. 29 may be implemented using computer system 117 in FIG. 1. In particular, this process may be implemented in decryptor 1502 in FIG. 15.

The process begins by receiving a block of encrypted information (operation 2900). Thereafter, the process identifies a key for use in decrypting the block of encrypted information (operation 2902). The process then performs a logic operation on the block of encrypted information using the key to generate a decrypted block of information (operation 2904), with the process terminating thereafter.

The block diagrams, flowcharts, and message flow diagrams in the different depicted embodiments illustrate the architecture, functionality, and operation of some possible implementations of apparatuses and methods in an illustrative embodiment. In this regard, each block in the block diagrams, flowcharts, and the message flow diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the block diagrams or message flow diagrams.

In some alternative implementations of an illustrative embodiment, the function, functions, operations, or message flow noted in the diagrams may occur out of the order noted in the figures. For example, in some cases, two messages shown in succession may be sent substantially concurrently, or the messages may sometimes be sent in the reverse order, depending upon the functionality involved. Also, other blocks may be added in addition to the illustrated blocks in the block diagrams or messages in the message flow diagrams.

Turning now to FIG. 30, an illustration of a data processing system is depicted in accordance with an illustrative embodiment. Data processing system 3000 may be used to implement computer system 117 in FIG. 1, number of computers 224 in FIG. 2, and other computers, data processing systems, or devices in satellite environment 100 in FIG. 1. In this illustrative example, data processing system 3000 includes communications framework 3002, which provides communications between processor unit 3004, memory 3006, persistent storage 3008, communications unit 3010, input/output (I/O) unit 3012, and display 3014. In these examples, communications framework 3002 may be a bus system.

Processor unit 3004 serves to execute instructions for software that may be loaded into memory 3006. Processor unit 3004 may be a number of processors, a multi-processor core, or some other type of processor, depending on the particular implementation. Further, processor unit 3004 may be implemented using a number of heterogeneous processor systems in which a main processor is present with secondary processors on a single chip. As another illustrative example, processor unit 3004 may be a symmetric multi-processor system containing multiple processors of the same type.

Memory 3006 and persistent storage 3008 are examples of storage devices 3016. A storage device is any piece of hardware that is capable of storing information, such as, for example, without limitation, data, program code in functional form, and/or other suitable information either on a temporary basis and/or a permanent basis. Storage devices 3016 also may be referred to as computer readable storage devices in these examples. Memory 3006, in these examples, may be, for example, a random access memory or any other suitable volatile or non-volatile storage device. Persistent storage 3008 may take various forms, depending on the particular implementation.

For example, persistent storage 3008 may contain one or more components or devices. For example, persistent storage 3008 may be a hard drive, a flash memory, a rewritable optical disk, a rewritable magnetic tape, or some combination of the above. The media used by persistent storage 3008 also may be removable. For example, a removable hard drive may be used for persistent storage 3008.

Communications unit 3010, in these examples, provides for communications with other data processing systems or devices. In these examples, communications unit 3010 is a network interface card. Communications unit 3010 may provide communications through the use of either or both physical and wireless communications links.

Input/output unit 3012 allows for input and output of data with other devices that may be connected to data processing system 3000. For example, input/output unit 3012 may provide a connection for user input through a keyboard, a mouse, and/or some other suitable input device. Further, input/output unit 3012 may send output to a printer. Display 3014 provides a mechanism to display information to a user.

Instructions for the operating system, applications, and/or programs may be located in storage devices 3016, which are in communication with processor unit 3004 through communications framework 3002. In these illustrative examples, the instructions are in a functional form on persistent storage 3008. These instructions may be loaded into memory 3006 for execution by processor unit 3004. The processes of the different embodiments may be performed by processor unit 3004 using computer-implemented instructions, which may be located in a memory, such as memory 3006.

These instructions are referred to as program code, computer usable program code, or computer readable program code that may be read and executed by a processor in processor unit 3004. The program code in the different embodiments may be embodied on different physical or computer readable storage media, such as memory 3006 or persistent storage 3008.

Program code 3018 is located in a functional form on computer readable media 3020 that is selectively removable and may be loaded onto or transferred to data processing system 3000 for execution by processor unit 3004. Program code 3018 and computer readable media 3020 form computer program product 3022 in these examples. In one example, computer readable media 3020 may be computer readable storage media 3024 or computer readable signal media 3026.

Computer readable storage media 3024 may include, for example, an optical or magnetic disk that is inserted or placed into a drive or other device that is part of persistent storage 3008 for transfer onto a storage device, such as a hard drive, that is part of persistent storage 3008. Computer readable storage media 3024 also may take the form of a persistent storage, such as a hard drive, a thumb drive, or a flash memory, that is connected to data processing system 3000. In some instances, computer readable storage media 3024 may not be removable from data processing system 3000.

In these examples, computer readable storage media 3024 is a physical or tangible storage device used to store program code 3018 rather than a medium that propagates or transmits program code 3018. Computer readable storage media 3024 is also referred to as a computer readable tangible storage device or a computer readable physical storage device. In other words, computer readable storage media 3024 is a media that can be touched by a person.

Alternatively, program code 3018 may be transferred to data processing system 3000 using computer readable signal media 3026. Computer readable signal media 3026 may be, for example, a propagated data signal containing program code 3018. For example, computer readable signal media 3026 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 3018 may be downloaded over a network to persistent storage 3008 from another device or data processing system through computer readable signal media 3026 for use within data processing system 3000. For instance, program code stored in a computer readable storage medium in a server data processing system may be downloaded over a network from the server to data processing system 3000. The data processing system providing program code 3018 may be a server computer, a client computer, or some other device capable of storing and transmitting program code 3018.

The different components illustrated for data processing system 3000 are not meant to provide architectural limitations to the manner in which different embodiments may be implemented. The different illustrative embodiments may be implemented in a data processing system including components in addition to and/or in place of those illustrated for data processing system 3000. Other components shown in FIG. 30 can be varied from the illustrative examples shown. The different embodiments may be implemented using any hardware device or system capable of running program code.

In another illustrative example, processor unit 3004 may take the form of a hardware unit that has circuits that are manufactured or configured for a particular use. This type of hardware may perform operations without needing program code to be loaded into a memory from a storage device to be configured to perform the operations.

For example, when processor unit 3004 takes the form of a hardware unit, processor unit 3004 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 3018 may be omitted, because the processes for the different embodiments are implemented in a hardware unit.

In still another illustrative example, processor unit 3004 may be implemented using a combination of processors found in computers and hardware units. Processor unit 3004 may have a number of hardware units and a number of processors that are configured to run program code 3018. With this depicted example, some of the processes may be implemented in the number of hardware units, while other processes may be implemented in the number of processors.

In this manner, a satellite may be shared by multiple users without having to employ additional communications links and controllers. In these illustrative examples, multiple users may access resources in a satellite through a communications link and computers on the satellite. An illustrative embodiment provides an ability to pass information through a command center for an owner in a manner that provides a desired level of security for the customer. In other words, the owner is unable to decipher commands sent by a customer through the owner's operations center. Additionally, telemetry that is returned also is not accessible by the owner at the satellite operations center.

Further, mission data may be sent through a separate path that does not pass through the gateway or satellite operations center in these illustrative examples. Also, an illustrative embodiment provides a capability to manage commands sent by the owner and a customer. In this manner, commands and data for a customer may be maintained in an independent and secure manner. The different illustrative embodiments may be applied to more than one customer sharing a satellite with an owner in these illustrative examples.

As a result, satellite environment 100 in FIG. 1 provides an ability for sharing satellites 102 with operators 104. In particular, satellite 114 may be shared with operators 104. With the use of satellite operations system 116, a reduction in the amount of resources 112 in satellite 114 may be used as compared to currently used systems for sharing satellites. Further, more efficient use of resources 112 in satellite 114 may occur with an ability to allow more than one operator to operate satellite 114.

Information management system 120 in satellite operations system 116 provides an ability to avoid conflicts between commands 128 that may be sent by operators 104. In addition, desired level of security 115 may be provided for operators 104. In other words, multiple levels of security may be supported in the sending of first information 124 and second information 126 between satellite 114 and operators 104.

Additionally, with satellite operations system 116, sharing of satellite 114 may be performed without requiring hardware changes to satellite 114. As a result, when sharing of satellite 114 may be needed on a short-term basis or on short notice, satellite 114 may be made available for use by other operators.

Additionally, with the use of satellite operations system 116, the amount of resources needed by operators 104 may be reduced. In other words, currently used operations centers 105 by owner 106 of satellite 114 may be used by operators 104. In this manner, additional hardware and software needed by operators 104 may be reduced if operators 104 do not own satellite 114. Further, operators 104 may avoid the expense and time needed to launch their own satellite.

Also, if multiple operators need access to satellite 114, the number of launch vehicles may be reduced through the sharing of satellite 114. In this manner, owner 106 may increase revenues for satellite 114 by increasing the use of resources 112 that may not occur when multiple operators in operators 104 are absent. As a result, unused capacity in resources 112 may be reduced.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A satellite system comprising:
a communications system in a satellite, wherein the communications system is configured to receive first information from a particular operator of a plurality of operators; and
a number of computers associated with the satellite, wherein the number of computers is configured to avoid conflicts between information sent by the communications system to the satellite from different operators in the plurality of operators that cause an undesired operation of the satellite, identify a block of information for encryption from instructions in the first information received by the communications system in the satellite, generate a key for the particular operator from a portion of the block of information identified in the first information based on the instructions in the first information from the particular operator, and encrypt the block of information using the key for the particular operator to form a block of encrypted information, and transmit the block of encrypted information to a remote platform over a number of communications links.

2. The satellite system of claim 1, wherein the instructions comprise an identification of at least one of the block of information and a portion of the block of information.

3. The satellite system of claim 1, wherein the number of computers is further configured to identify the block of information from a plurality of blocks of information for encryption.

4. The satellite system of claim 1, wherein the block of information comprises telemetry.

5. The satellite system of claim 4, wherein the telemetry comprises commands received in the first information and processed by the number of computers.

6. The satellite system of claim 1, wherein in being configured to generate the key for the particular operator from the portion of the block of information, the number of computers is configured to perform at least one of reversal, inversion, reduplication, mirroring, and mirroring with inversion on the portion of the block of information to form the key.

7. The satellite system of claim 1, wherein in being configured to transmit the block of encrypted information, the number of computers is configured to transmit the block of encrypted information to an operations center.

8. The satellite system of claim 1, wherein the portion of the block of information is a word.

9. The satellite system of claim 1, wherein the number of computers comprises a first module and a second module, wherein the first module is configured to decrypt commands in the first information and wherein the second module is configured to process the commands, identify the block of information generated in response to processing the commands from the instructions in the first information, generate the key for the particular operator from the portion of the block of information based on the instructions, encrypt the block of information using the key for the particular operator to form the block of encrypted information, and transmit the block of encrypted information.

10. The satellite system of claim 1 further comprising:
a computer system in a location remote to the satellite, wherein the computer system is configured to receive the block of encrypted information and decrypt the block of encrypted information using the key for the particular operator.

11. The satellite system of claim 1, wherein in being configured to identify the block of information for encryption from instructions in the first information received by the communications system in the satellite, the number of computers is configured to identify another block of information to not encrypt from other instructions in second information received by the communications system in the satellite from another operator in the plurality of operators.

12. A satellite system comprising:
a first module in a satellite, wherein the first module is configured to receive first information from a particular operator of a plurality of operators; avoid conflicts between information sent from different operators in the plurality of operators that cause an undesired operation of the satellite; and decrypt commands in the first information; and
a second module in the satellite, wherein the second module is configured to process the commands decrypted by the first module, generate a key for the particular operator from a portion of a block of information including a number of commands processed, encrypt a block of telemetry using the key for the particular operator to form a block of encrypted information, and transmit the block of encrypted information.

13. The satellite system of claim 12, wherein the second module is further configured to identify the block of information.

14. The satellite system of claim 12, wherein the second module is configured to identify the block of information from instructions received in the first information and generate the key for the particular operator from the portion of the block of information including the number of commands processed based on the instructions received in the first information.

15. The satellite system of claim 12, wherein the block of information comprises telemetry, and wherein the telemetry comprises the commands received in the first information by the first module and processed by the second module.

16. The satellite system of claim 12, wherein in being configured to generate the key for the particular operator from the portion of the block of information, the second module is configured to perform at least one of reversal, inversion, reduplication, mirroring, and mirroring with inversion on the portion of the block of information to form the key.

17. The satellite system of claim 12 further comprising:
a computer system in a location remote to the satellite, wherein the computer system is configured to receive the block of encrypted information and decrypt the block of encrypted information using the key for the particular operator.

18. A method for transmitting information, the method comprising:
receiving in an uplink at a satellite first information from a particular operator of a plurality of operators;
processing commands received in the first information while avoiding conflicts between information sent from different operators in the plurality of operators that cause an undesired operation of the satellite;
identifying a block of information resulting from processing the commands received in the first information in the uplink at the satellite;
generating a key for the particular operator from a portion of the block of information resulting from processing the commands received in the first information in the uplink at the satellite based on instructions received in the first information in the uplink at the satellite;
encrypting the block of information using the key for the particular operator to form a block of encrypted information; and
transmitting the block of encrypted information from the satellite in a downlink.

19. The method of claim 18, wherein identifying the block of information resulting from processing the commands comprises:
identifying the block of information resulting from processing the commands based on the instructions received in the first information in the uplink.

20. The method of claim 18, wherein generating the key for the particular operator from the portion of the block of information based on the instructions received in the first information comprises:
performing at least one of reversal, inversion, reduplication, mirroring, and mirroring with inversion on the portion of the block of information to form the key for the particular operator based on the instructions received in the first information.

* * * * *